United States Patent [19]

Kikukawa et al.

[11] Patent Number: 4,562,117
[45] Date of Patent: Dec. 31, 1985

[54] MAGNETIC RECORDING MEDIUM AND A PROCESS OF FABRICATING SUCH MAGNETIC RECORDING MEDIUM

[75] Inventors: Shozo Kikukawa, Akigawa; Yoshitaka Yasufuku, Hino, both of Japan

[73] Assignee: Konishiroku Photo Industry Co., Ltd., Tokyo, Japan

[21] Appl. No.: 614,465

[22] Filed: May 25, 1984

[30] Foreign Application Priority Data

| May 26, 1983 | [JP] | Japan | 58-93054 |
| May 26, 1983 | [JP] | Japan | 58-93055 |
| Sep. 24, 1983 | [JP] | Japan | 58-176657 |
| Sep. 24, 1983 | [JP] | Japan | 58-176658 |

[51] Int. Cl.⁴ ............................................. G11B 5/70
[52] U.S. Cl. ............................... 428/407; 252/62.54; 360/134; 360/135; 360/136; 428/694; 428/900; 427/128
[58] Field of Search ............... 428/694, 695, 900, 407; 427/128, 131; 252/62.54; 360/134–136

[56] References Cited

U.S. PATENT DOCUMENTS

| 3,804,797 | 4/1974 | Broxterman | 524/84 |
| 3,976,822 | 8/1976 | Thomas | 428/694 |
| 4,063,000 | 12/1977 | Aonuma | 428/403 |
| 4,135,036 | 1/1979 | Muharda | 428/694 |
| 4,178,416 | 12/1979 | Hector | 428/694 |
| 4,197,347 | 4/1980 | Ogawa | 428/694 |
| 4,328,282 | 5/1982 | Lehner | 428/480 |
| 4,407,901 | 10/1983 | Miyatsuha | 428/407 |
| 4,439,486 | 3/1984 | Yamada | 427/128 |
| 4,529,661 | 7/1985 | Ninomiya | 428/694 |

FOREIGN PATENT DOCUMENTS

| 2920334 | 12/1980 | Fed. Rep. of Germany | 428/694 |
| 126511 | 10/1979 | Japan | 428/694 |
| 0141017 | 9/1982 | Japan | 428/327 |

*Primary Examiner*—Ellis P. Robinson
*Attorney, Agent, or Firm*—Jordan B. Bierman

[57] ABSTRACT

A magnetic recording medium comprising a support and provided thereon a magnetic layer containing magnetic powder and a copolymer capable of being soluble in water by 10 parts by weight or more per 100 parts by weight of water.

Further, a process of preparing a magnetic recording medium wherein magnetic powder is treated with a copolymer capable of dissolving 10 parts by weight or more per 100 parts by weight of water in an aqueous medium under presence of a metal ion and a magnetic paint containing this treated magnetic powder is coated on base to form a magnetic layer is also provided.

Further a process of preparing a magnetic recording medium wherein magnetic powder emulsion that has been pretreated for a higher coercive force is filtered to separate unnecessary materials from magnetic powder and said magnetic powder is surface treated in an aqueous medium with a copolymer capable dissolving 10 parts by weight or more per 100 parts by weight of water, and a magnetic paint comprising this surface treated magnetic powder is coated on base to form a magnetic layer.

14 Claims, 13 Drawing Figures

MAGNETIC RECORDING MEDIUM AND A PROCESS OF FABRICATING SUCH MAGNETIC RECORDING MEDIUM

BACKGROUND OF THE INVENTION

1. Field of the Invention

The present invention relates a magnetic recording medium, such as a magnetic tape, magnetic sheet, or the like, and a process of fabricating such magnetic recording medium.

2. Description of the Prior Art

In recent years, as magnetic materials, particularly recording mediums used for the video tape recorder and computer are improved for higher recording density and for higher S/N ratio, magnetic powder of smaller grain size is used. For example, if considered in term of the BET value that refers to the surface area per unit weight, magnetic powder of a class of 19 to 23 m$^2$/g is used for the standard grade of the magnetic tape of both VHS and BETA system; magnetic powder of a class of 23 to 28 m$^2$/g for the higher grade of the magnetic tape; and magnetic powder of a class of 29 to 33 m$^2$/g for the superhigh grade of magnetic tape. Further, in the near future, powder of a class of 35 to 50 m$^2$/g is expected to marketed.

Generally, the S/N ratio of a magnetic recording medium is believed to be proportional to the square root of the number of grains of magnetic material in the recording medium that are involved in recording and playback. When the same weight of magnetic powder is used for coating, therefore, use of a magnetic material of a smaller grain size is more preferable in increasing the S/N ratio. Since the surface area of grains is inversely proportional to the square of the grain size, however, a decreasing grain size means sharply increasing difficulties encountered in the dispersion of powder and more deterioration in the stability of dispersion.

Normally, to disperse magnetic powder, a quantity of dispersant that is just enough to cover the surfaces of all grains of magnetic powder must be sufficient. Actually, however, it does not give satisfactory dispersion and stability and, therefore, the dispersant is added in considerable excess. The fraction of dispersant that is not adsorbed on the surfaces of magnetic grains mixes with the binder in the coating, which plasticizes the magnetic layer or prevents hardening of the binder, resulting in a pronounced reduction in the mechanical strength of the magnetic layer and particularly in the Young's modulus. Recently, with improvements of the magnetic tape for longer recording, there appears a tendency to use a thinner base film to achieve a smaller total thickness of tape. Since the stiffness of the tape is proportional to the cube of the tape thickness, the tape loses its stiffness sharply as it is made thinner. This results in inferior running performance of the thin tape and its poor head contact, leading to a lowered S/N ratio. To maintain the mechanical properties, and particularly the stiffness of tape in spite of a smaller thickness, a super-oriented base film is adopted and the magnetic layer is improved in the Young's modulus. For this reason, a dispersant in excess and other low molecular additives, if used, impair the mechanical properties of a thin film significantly.

Various techniques have been disclosed to disperse the magnetic powder effectively and stably without affecting the mechanical properties of the magnetic layer adversely. For example, in Japanese Patent Opening Nos. 94308/1979, 143894/1979 and 92103/1975, the magnetic powder is pretreated with a phosphate ester derivative.

Further, in Japanese Patent Opening Nos. 134899/1976, 51703/1978, 7898/1978 and 46509/1979, there is disclosed a technique of coating the surface of magnetic layer with silicone oil.

Further, in Japanese Patent Opening Nos. 108902/1975, 97738/1974, 33753/1976, 116114/1978, 24000/1979, etc., a surface treatment with an anionic surfactant is made. However, these disclosures can not be asserted to be effective in case of magnetic powder of smaller grains and particularly the one having a BET value of 35 to 40 m$^2$/g or over.

Further, in Japanese Patent Opening Nos. 103403/1976, 33602/1972, 125169/1980, 73929/1980, 73930/1980, 42888/1982, and 1026/1982, techniques are disclosed to coat magnetic grains with oligomer or polymer containing functional groups that can be adsorbed on the surface of these grains.

These techniques mix dry magnetic grains with a dispersant solution to have the dispersant adsorbed on the surface of these grains in a process that requires successive steps of dissolving the dispersant, mixing with magnetic grains, agitation, kneading, filtration, drying, pulverization, and sieving. Since dry magnetic powder is provided in a coagulated state, however, addition of a dispersant thereto and kneading of the mixture will fail to disperse the magnetic powder so fully as to separate individual primary grains of such powder, making it difficult to coat individual primary grains with polymer. It is noted that forcible dispersion until these primary grains separate will break needle-like grains. Clusters, each containing a plurality of magnetic grains, are thus coated with polymer. For this reason, no improvement in the dispersibility is achieved.

Among various kinds of magnetic powder, particularly, Co-deposited $\gamma$-Fe$_2$O$_3$ powder is widely used for the magnetic material of video tape, high fidelity audio tape and computer tape. The general process of preparing such Co-deposited $\gamma$-Fe$_2$O$_3$ is as follows. First, sodium hydroxide (NaOH) is added to a solution of ferrous sulfate (FeSO$_4$.7H$_2$O) to produce ferrous hydroxide (Fe(OH)$_2$), which is oxidized in air and washed to form $\alpha$-FeOOH for use as nuclei for crystalline growth. Another solution of ferrous sulfate is prepared, to which $\alpha$-FeOOH as nuclei and metal iron are added. As the solution is heated under air bubbling, iron is oxidized and dissolves to form $\alpha$-FeOOH, which deposits in surfaces of $\alpha$-FeOOH that presents as nuclei for crystalline growth. As crystals, for example, 0.6 to 1.0$\mu$ long and 0.1 to 0.3$\mu$ thick have grown, the reaction is stopped. Filtration, washing with water and drying give powder of geothite. This is further dehydrated and reduced to Fe$_3$O$_4$ in a H$_2$ stream at a temperature of about 400° C., which is converted to $\gamma$-Fe$_2$O$_3$ as it is slowly reheated up to about 200° C. $\gamma$-Fe$_2$O$_3$ thus prepared is used to provide nuclei for further crystalline growth. It is introduced in an aqueous solution of iron sulfate and cobalt sulfate. Addition of an alkali followed by 1 to 2 hour oxidation at 60° to 80° C. then deposits cobalt iron oxide in surfaces of $\gamma$-Fe$_2$O$_3$ nuclei. Filtration, washing with water and drying gives Co-deposited Fe$_2$O$_3$ grains.

A technique that is concerned in such Co-deposited $\gamma$-Fe$_2$O$_3$ powder is disclosed, for example, in Japanese Patent Opening No. 138110/1982 wherein in the process of preparing magnetic powder a cationic surfactant is added at the step of washing with water that follows the step of cobalt deposition to increase the squareness ratio and improve packing. However, even such technique has a problem that the dispersibility is still unsatisfactory and a favorable squareness ratio, etc. cannot be achieved. Further, in Japanese Patent Opening No. 10903/1981, a technique is disclosed that Co-deposited $\gamma$-$Fe_2O_3$ that is still at a wet state is treated with low molecular surfactant. However, even this technique fails to give satisfactory dispersibility.

On the one hand, as a treatment agent to treat magnetic powder, Japanese Patent Opening Nos. 23207/1975 and 22603/1975 disclosed a kind of copolymer. It contains monomer units of

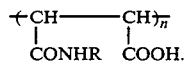

Its original carboxyl groups are partially converted to amido groups (—CONHR) with an aim that their alkyl group (—R) may give a lipophilic property so in kneading the magnetic paint the magnetic powder may be more miscible with the binder. Therefore, in a process that includes a treatment in an aqueous system like the process of preparing the Co-deposited $\gamma$-$Fe_2O_3$ as mentioned above, it is impossible to surface treat magnetic grains with the above copolymer without causing poor dispersion of magnetic grains in the aqueous medium.

The present authors have reached a conclusion that though the process of preparing the magnetic powder (for example, Co-deposited $\gamma$-$Fe_2O_3$) its primary magnetic grains are separately dispersed in the wet state after their preparation, but that once dried, these grains are clustered so firmly that it is very difficult to redisperse them separately as before and particularly needle-like magnetic grains, if forcibly redispersed separately, are liable to breakage, etc. As a result, a surface treatment of magnetic powder at a clustered state occurs, which has no effect in improving.

OBJECTS AND SUMMARY OF THE INVENTION

Accordingly, it is an object of the present invention to provide a magnetic recording medium that uses a magnetic powder of improved dispersibility.

It is another object of the invention to provide a process of preparing a magnetic recording medium that is easy to perform, costs low and uses a magnetic powder of improved dispersibility.

Namely, the invention is concerned in a magnetic recording medium wherein the magnetic layer thereof is loaded with magnetic powder and a copolymer having a solubility of 10 parts by weight or more per 100 parts by weight of water.

The invention also provides a process of preparing a magnetic recording medium wherein as a method of preparing the above magnetic powder efficiently with high reproducibility the magnetic powder is treated in an aqueous or hydrophilic medium under presence of metal ions with a copolymer having a solubility of 10 parts by weight or more per 100 parts by weight of water and a magnetic paint comprising this treated magnetic powder is coated on a base to form a magnetic layer.

Further, the invention provides a process of preparing a magnetic recording medium wherein a magnetic powder dispersed solution that was pretreated for a higher coercive force is filtered for separation of the magnetic powder from unnecessary materials, the separated magnetic powder is further treated in an aqueous or hydrophilic medium with a copolymer having a solubility of 10 parts by weight or more per 100 parts by weight of water, and a magnetic paint comprising the magnetic powder thus treated is coated on a base to form a magnetic layer.

Since, according to the invention, for the above copolymer that is used as a dispersant of the magnetic powder, a copolymer having a solubility of 10 parts by weight or more per 100 parts by weight of water is used, the surface treatment of the magnetic powder in an aqueous medium (for example, the route Ⓐ in FIG. 1 representing a process step of depositing cobalt on the surface of $\gamma$-$Fe_2O_3$ powder under presence of cobalt ions) binds such copolymer to hydrophilic surfaces of magnetic grains satisfactorily. For this end, it is essential that the above copolymer has a solubility of 10 parts by weight or more per 100 parts by weight of water. A concentration of the copolymer in this range improves the dispersibility of the magnetic powder as shown in FIG. 2 and therefore its squareness ratio remarkably. It is noted however that if being excessively soluble in water, the copolymer will remain in aqueous solution instead of being adsorbed to magnetic powder, so satisfactory adsorption will not be achieved. Therefore, it is preferable that the solubility of the copolymer does not exceed 100 parts by weight per 100 parts by weight of water and to fully achieve both satisfactory dispersibility and adsorption, a solubility of 10 to 80 parts by weight of copolymer/100 parts by weight of water is more preferable. It is noted that the term "solubility" used herein is defined as the concentration of copolymer just before the solution becomes turbid as the copolymer is dissolved in an increasing amount in a given weight of water.

Since the magnetic powder treated with the above copolymer is thought to comprise primary magnetic grains coated with an organic polymer (above copolymer) wherein hydrophilic groups of the polymer is oriented toward the hydrophilic surface of magnetic grains and hydrophobic groups thereof outward. Therefore, when it is used for a magnetic paint, dispersion is established very easily. Further, being a water-soluble polymer, the above copolymer does not dissolve in the solvent of magnetic paint, hardly being stripped off the magnetic powder. Therefore, it is capable of giving excellent stability to the dispersed solution. At the same time, mixing of the dispersant in excess with the binder, a factor that affects the mechanical properties of the magnetic layer, is avoided (namely, after a treatment in the aqueous or hydrophilic medium, the remaining fraction of the copolymer that has not been adsorbed on the magnetic powder is removed with the mother liquor).

The above magnetic powder embodying the present invention can be prepared either by adsorption of the copolymer to the surfaces of magnetic grains in the route Ⓐ of FIG. 1 or by deposition of cobalt, filtration, washing, as necessary, and immediate emulsification in an aqueous or hydrophilic medium loaded with the water-soluble copolymer of the present invention (for example, in its aqueous solution) to result in adsorption of the copolymer to the surfaces of magnetic grains as in the route of Ⓑ of FIG. 1.

These methods use existing equipment intended for preparation of the magnetic powder, requiring no special equipment, which allows production at low cost.

The term "aqueous or hydrophilic medium" used herein is a water based medium in case of oxide magnetic powder containing cobalt. Small quantities of water-miscible solvents, such as alcohols, ketones, water-miscible cyclic ethers, and amines, may be used in combination with water. Further, in case of metal magnetic powder, a water-miscible solvent such as methanol is used.

In this case, the adsorption of the water-soluble polymer (above copolymer) to surfaces of magnetic grains depends on the pH level of mother liquor. As indicated in FIG. 4, the pH is preferably set to 7 or under and more preferably to 6 or even 5.5 or under since an alkaline pH lowers the adsorption significantly. The adsorption of the water-soluble polymer is 1 to 10 g and preferably 1 to 5 g per 100 g of magnetic powder. Generally, after cobalt deposition, the mother liquor is at a high pH level, so it is advisable to lower the pH down to 7 or under by addition of inorganic acid before starting adsorption of the water-soluble polymer. It is also advisable to filter the magnetic powder after cobalt deposition and wash it with water to remove the by-products of the reaction before performing the treatment of the present invention.

As already mentioned, the magnetic powder embodying the invention exhibits favorable dispersibility. To increase the rate of dispersion and stability of the emulsion, however, a dispersant, for example, lecithin preferably in the powdery form, oleic acid, phosphoric acid ester, or the like may be added in a small quantity.

The surface treatment of the magnetic powder with the above copolymer can be performed, for example, in a hydrophilic solvent such as methanol-water mixture at the final step of the ordinary process of preparing the metal magnetic powder from $\gamma$-$Fe_2O_3$.

Other objects and aspects of the invention will become apparent from the following description of embodiments with reference to the accompanying drawings.

DESCRIPTION OF THE PREFERRED EMBODIMENTS

First, the above copolymer used in the present invention for a pretreatment of surfaces of magnetic powder will be described in detail. This copolymer contains a monomer component having one or more anionoid organic groups (hereinafter referred "monomer unit A"). Preferable examples of such anionoid organic group are carboxyl, phosphoric group, sulfonic group, etc. among which the former two are more preferable. These groups may be provided in the form of ammonium salt, alkali metal salt, etc., among which the ammonium salt is preferable. Examples of the monomer unit A are acrylic acid, methacrylic acid, maleic anhydride, 2-hydroxyethylacryloylphosphate, etc., among which the former three are preferable.

Preferable examples of the above anionoid organic group are thus carboxyl group, phosphoric group, and their ammonium salt.

Acrylic acid, methacrylic acid and maleic anhydride are preferable for the monomer unit A since it performs particularly favorably in preservation and dispersibility. The additive that has been heretofore used for an improvement of the blooming phenomenon, etc. suppresses such phenomenon to a certain extent but it affects the preservation, being liable to give rise to a sticky performance and tending to cause coagulation at the step of magnetic powder dispersion.

The copolymer used in the present invention performs excellently in these respects.

In the above copolymer, various anionoid organic groups exert effects as mentioned below. A mere anionoid organic group, for example, free carboxyl group —COOH and its salt, for example, ammonium or sodium salt differ in the dissociation constant.

[Dissociation constant K]

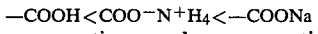

—COOH < COO$^-$N$^+$H$_4$ < —COONa

Figure 3:
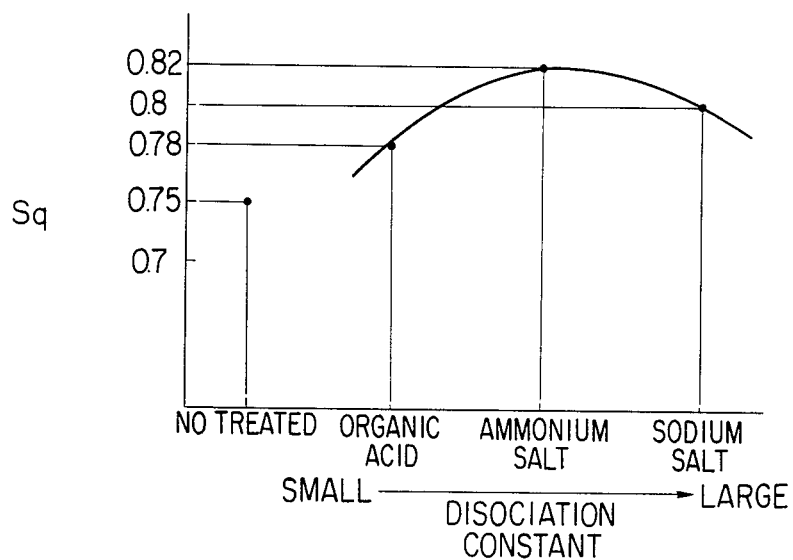
FIG. 3 is a curve showing dependency of the squareness ratio of the magnetic recording medium on the kind of copolymer.
Figure 4:
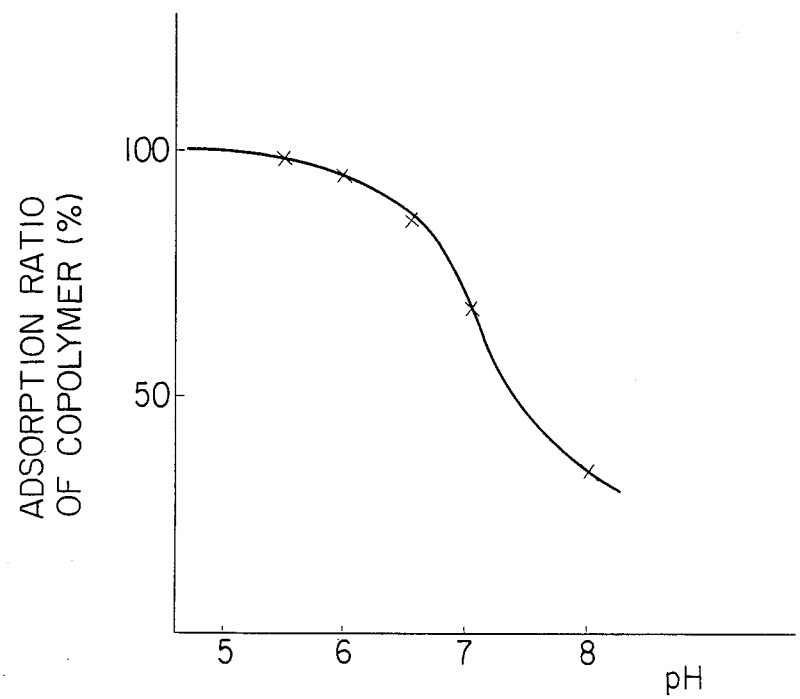
FIG. 4 is a curve showing dependency of the adsorption of the copolymer on the pH value.

When magnetic powder preparations that had been individually surface treated with copolymers having these groups, respectively, on their monomer unit A were used to form the magnetic layer by a method as mentioned in detail later, the magnetic recording mediums concerned were found to exhibit squareness ratios (Bm/Br), for example, as shown in FIG. 3. Namely, compared to the a copolymer that contains merely the —COOH group, a copolymer whose carboxyl group —COOH is converted to the form of salt according to the present invention increases the squareness ratio. The reason could be that when the —COOH group is converted to a salt, the copolymer itself becomes more hydrophilic and, once adsorbed in surfaces of magnetic grains, it does not dissolve in solvent and, therefore, is hardly stripped off during dispersion of such grains in solvent or binder, which means no loss of the effect of surface treatment. By contrast, the carboxyl group —COOH, though having a property to be readily adsorbed or bound to surfaces of magnetic grains, is more lipophilic as compared to its salt, the copolymer with such group tends to dissolve in the solvent to lose the intended effect of surface treatment. Further, the stripped copolymer oozes in the surface of tape. As a result, it can be considered that no adsorption or binding to the surfaces has occurred. Further, it is seen from FIG. 3 that among the above organic groups of the invention, the group in the form of ammonium salt gives better magnetic characteristics than the one in the form of alkali metal salt, namely, when the ammonium salt is used the squareness ratio reaches the maximum while there is a tendency to lower this parameter as the dissociation constant increases or decreases from that of the ammonium salt. The explanation is that since the alkali metal salt is more hydrophilic probably because of a significantly higher dissociation constant, it has a property that it is readily bound to and separate from the surfaces of magnetic grains while the ammonium salt, though not adsorbed so much as the free acid, is less liable to be stripped off in solvent, which accounts for the highest dispersibility. Namely, because of the proper dissociation constant of the ammonium salt, priority is given to its binding to surfaces of magnetic grains, which could explain the above finding.

Ammonium salts as expressed by a general formula $$-COO^-N^+(R^1)(R^2)(R^3)(R^4)$$

where $R^1$, $R^2$, $R^3$ and $R^4$ are selected among hydrogen atom and lower alkyl groups and need not be different may be used. It is noted that the above formula includes the already mentioned —$COONH_4$. In case the above $R^1$, $R^2$, $R^3$ and/or $R^4$ are lower alkyl groups, it is preferable to limit the total number of carbon atoms in these groups to 6 in order to avoid a possibility of a steric hindrance that may affect the basicity of the ammonium salt.

When expressed in terms of the monomer unit A as already mentioned, which is represented by a symbol 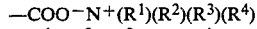 and the monomer unit B, which is represented by a symbol $+B+$, the above copolymer used in the present invention can be expressed $+A+_m +B+_n$ where m and n are positive real numbers. The parameter (m+n) has a mean value of 100 or under and preferably 50 or under. A value of the parameter above 100 is not preferable, for such high value makes it difficult to achieve uniform dispersion in the magnetic layer of magnetic recording medium, often causing local nonuniformity of performances, for example, output from the magnetic recording medium. More preferably, the parameter (m+n) is 30 or under. In this range, a particularly good dispersion effect is expected and therefore the magnetic recording medium embodying the invention is improved very remarkably in performances. It is noted that to prevent blooming the mean value of the parameter (m+n) is preferably, for example, at least 4. Selection of values for the parameters m and n and the salt type of organic group in the monomer unit A will give proper control of both the hydrophilic and lipophilic properties, namely, hydrophile lipophile balance or HLB of the copolymer.

For the monomer component of the copolymer (hereinafter referred "monomer unit B") other than the monomer unit A, for example, styrene and their derivatives can be used. Examples of such derivatives are o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, 3,4-dichlorostyrene, etc.. Vinyl monomers other than the above, for example, unsaturated ethylenic monoolefins, vinyl halides, vinyl acetate, vinyl esters, α-methylene aliphatic monocarboxylic acid esters, derivatives of acrylic and methacrylic acids, vinyl ethers, vinyl ketones, N-vinyl compounds, and vinylnaphthalenes may also be used. Examples of unsaturated ethylenic monoolefins are ethylene, propylene, butylene, isobutylene, diisobutylene, isononene, isododecene, etc. Examples of vinyl halides are vinyl chloride, vinylidene chloride, vinyl bromide, vinyl fluoride, etc. Examples of vinyl esters are vinyl propionate, vinyl benzoate, vinyl butyrate, etc. Examples of α-methylene aliphatic monocarboxylic acid esters are methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, phenyl acrylate, methyl α-chloroacrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, diethylaminoethyl methacrylate, etc. Examples of derivatives of acrylic and methacrylic acids are acrylonitrile, methacrylonitrile, acrylamide, etc. Examples of vinyl ethers are vinyl methyl ether, vinyl ethyl ether, vinyl isobutyl ether, etc. Examples of vinyl ketones are vinyl methyl ketone, vinyl hexyl ketone, methyl isopropenyl ketone, etc. Examples of N-vinyl compounds are N-vinylpyrrole, N-vinylcarbazole, N-vinylindole, N-vinylpyrrolidone, etc.

A copolymer that is preferably used for the above mentioned copolymer (water-soluble polymer), when provided in the form of salt, comprises a monomer component for the monomer unit A that contains two or more carboxylate groups. Use of such monomer component is preferable with respect to the solubility and dispersibility of the copolymer. For the above monomer component, there can be cited monomers having two carboxylate groups on their main alkylene chain, for example, as expressed by one of the following formulas:

(1) 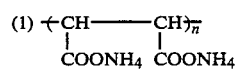

where the parameter n is the number of repeated units (the same definition applies hereinafter; this monomer unit can be prepared under action of ammonia using maleic anhydride as the starting material);

(2) 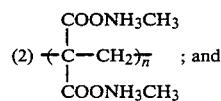 ; and (3) 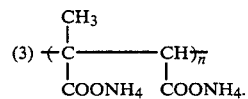

On the other hand, alkylenes, arylalkylenes and their derivatives are preferably used for the monomer unit B, among which alkylenes are more preferable. Particularly, branched chain alkylenes of 4 or more carbon atoms are preferable since they are highly miscible with organic solvents to allow satisfactory kneading with the binder. A preferable monomer unit B is given, for example, by use of one of the following starting materials:

(1) Isobutylene,
(2) 2,3-dimethyl-1-butene,
(3) 2,3-dimethyl-1-pentene,
(4) isooctene (diisobutylene),
(5) isododecene, and
(6) Isononene.

The aforementioned copolymer used in the present invention may be prepared by copolymerization of monomers as selected from the aforementioned starting materials. For example, maleic anhydride-alkylene copolymer is synthesized. Its hydrolysis opens the closed structure of the maleic anhydride units. Carboxyl groups thus formed are reacted with ammonia to ammoniate both carboxyl groups in the monomer unit A as mentioned above. In this case, however, some maleic anhydride units may be left intact with their closed structure retained at the above step of hydrolysis. Such closed structure may then open by the above reaction with ammonia to give a half amide in which one carboxyl group of the monomer unit A is converted to the amide and the other to the ammonium salt. Or it may be left closed even under action of ammonia. The ratio of opened rings to closed ones of the above maleic anhydride units and therefore the degree of ammoniation of carboxyl groups of monomer units A can be controled by the degree of the hydrolysis as mentioned above. Further, formation of the above half amide or retension of maleic anhydride units of closed structure at a proper percentage allows control of the solubility of the copolymer in water.

Gas chromatography/mass spectroscopy of copolymers thus produced gaves, for example, separate peaks of isooctene and isobtylene corresponding to the alkene portion and separate peaks of toluene, diethylbenzene, styrene, etc. corresponhding to the acid portion (for example, maleic anhydride), identifying these copolymers.

Copolymers that were mentioned above by way of example for use in the present invention exhibit the hydrophilic property of the monomer units A and the lipophilic property of the monomer units B repeatedly along their molecule. Once the monomer units A of the copolymer are bound to surfaces of magnetic grains, therefore, the monomer units B take effect in avoiding stripping of the copolymer. Further, when kneading is performed with the binder, monomer units B give a satisfactorily high dispersibility. In the treatment of the magnetic powder, 100 parts by weight of the powder is preferably loaded with 1 to 20 parts by weight of the copolymer. If the copolymer content is reduced beyond the lower limit of the above range, only a poor dispersing effect will be exerted, while an excessive loading is not preferable with respect to the mechanical strength of the magnetic layer and recording characteristics.

To surface treat magnetic powder with this copolymer, the routine process can be used wherein after magnetic powder is immersed in an aqueous solution of cobalt compound, for example, $CoSO_4$ under addition of an alkali such as NaOH or the like to deposit cobalt in surfaces of magnetic grains, an inorganic acid such as sulfuric acid is added to lower the pH level of the mother liquor and at this state the treatmeht with the above copolymer is conducted. Alternatively, after cobalt deposition, the magnetic powder can be filtered and, if necessary, washed to remove impurities (reaction by-products) before performing adsorption of the copolymer. Examples of the solvent used in the above process are water, aqueous solution of methanol, ethanol, propanol, acetone, methyl isobutyl ketone, tetrahydrofuran, dioxane, pyridine, hydroxyquinoline, etc. Thereafter, the above treated magnetic powder is kneaded with the binder and various additives by a routine method to prepare a magnetic paint. The paint is coated on the base and dried to form a magnetic layer. Calendering and slitting gives magnetic recording mediums, for example, magnetic tapes.

Figure 1:
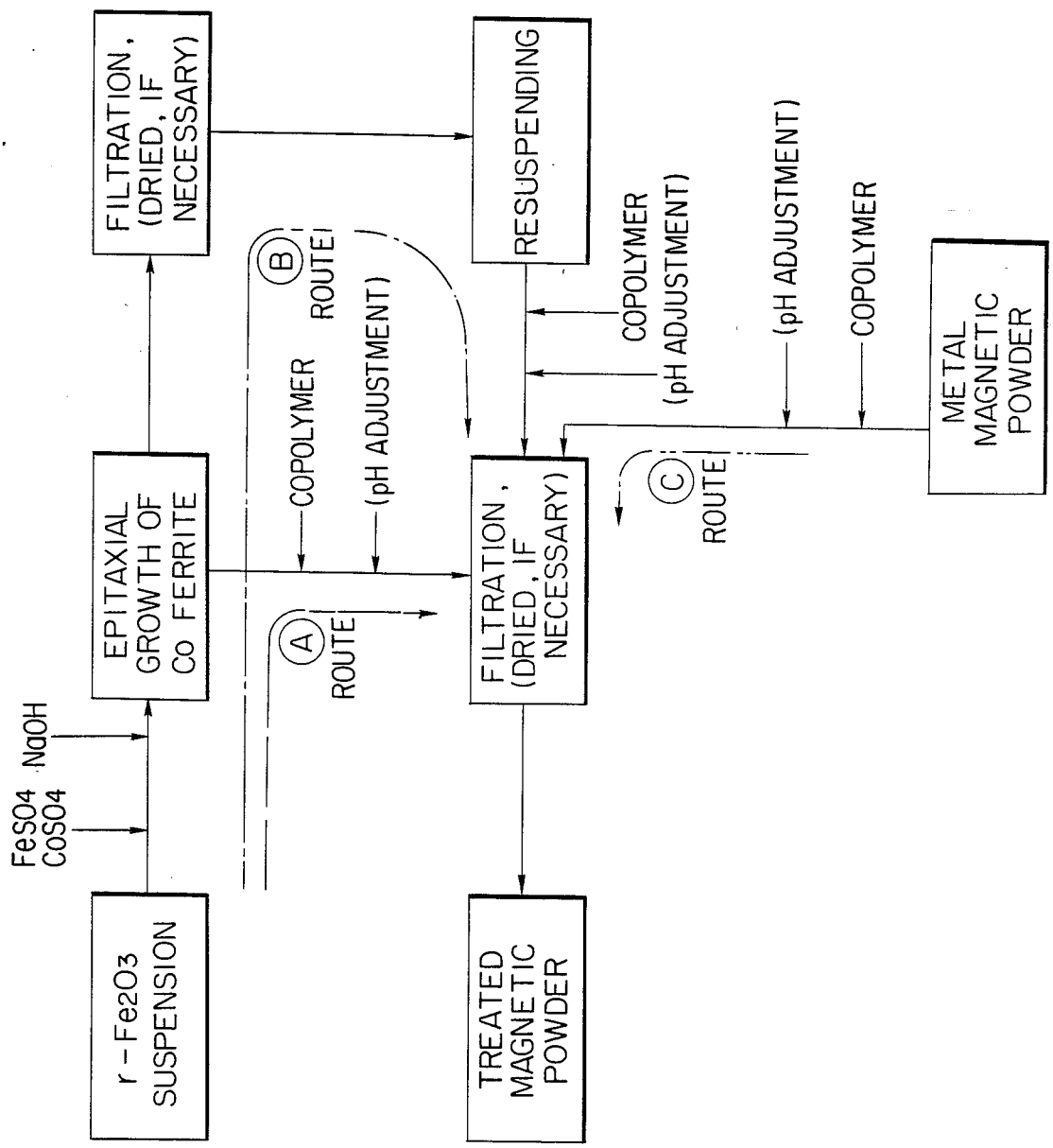
FIG. 1 is a flow chart of a process of preparing a magnetic recording medium embodying the invention.
Figure 2:
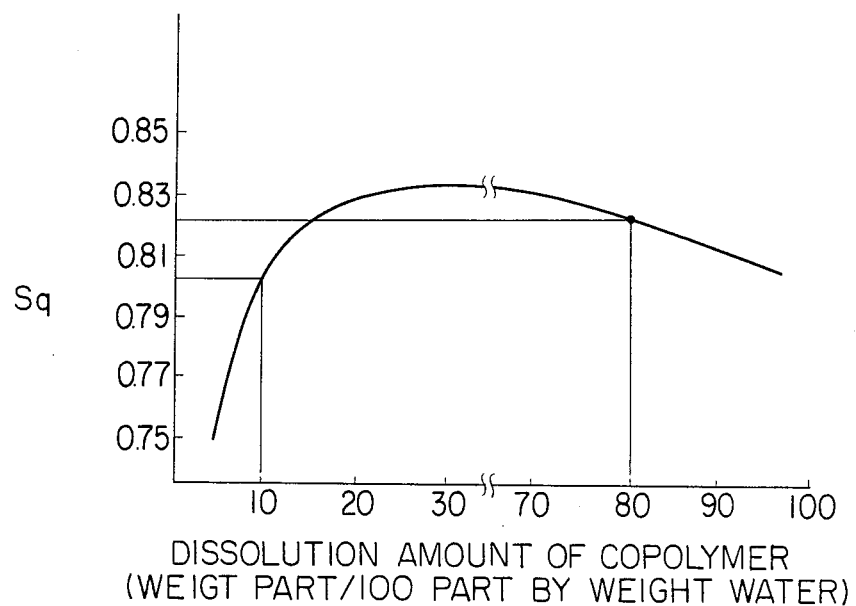
FIG. 2 is a curve showing dependency of the squareness ratio of the magnetic recording medium, namely, the adsorption of the surface treatment agent copolymer on its solubility.

In the process flow chart of FIG. 1, particularly, the route Ⓑ includes an additional step of filtering an emulsion of magnetic powder that has undergone the growth of cobalt ferrite (cobalt deposition) for a higher coercive force. This step removes unnecessary substances and free cobalt ions, so there is produced magnetic powder of favorable performances. Further, on this route Ⓑ, various solvents can be used for reemulsification. At this reemlsification step an additive that mixes well with the binder, for example, a dispersant that is weakly water-soluble, such as lecithin, higher fatty acid, or the like, may be added for further control of the physical properties of magnetic powder. On the other hand, in the route Ⓒ, the emulsion of magnetic metal powder that is prepared by the method of prior art may be loaded with the copolymer. An example of such metal powder is iron powder produced by reduction of $\gamma$-$Fe_2O_3$ or by reduction of $Fe_3O_4$ which is derived from $\gamma$-$Fe_2O_3$ that results from dehydration of $\alpha$-FeOOH.

It was found that when magnetic powder and particularly magnetic metal powder is surface treated in the above aqueous system and the treated powder is then immersed in an organic liquid, for example, toluene or methanol and further if necessary dried, presence of an oxidative atmosphere such as oxygen gas or air inactivates active sites, for example, active iron atoms, etc. located in surfaces of the above magnetic powder to stabilize such surfaces. Namely, the above oxidative gas may provide at least partial gradual oxidation of surfaces of magnetic powder to stabilize the magnetic powder itself.

In the magnetic recording medium of the invention, polyurethane may be used for the binder of magnetic layer, which can be synthesized by the reaction of the polyol and polyisocyanate components. Applicable polyols are, for example, polyester polyols as synthesized by a reaction of a dibasic organic acid, such as phthalic acid, adipic acid, linoleic acid dimer, maleic acid, and one or more polyols as selected from glycols, such as ethylene glycol, propylene glycol, butylene glycol and diethylene glycol, and polyalcohols, such as trimethylolpropane, hexanetriol, glycerin, trimethylolethane and pentaerythritol; lactone polyester polyols as synthesized from lactams, such as s-caprolactam, a-methyl-1-caprolactam, s-methyl-s-caprolactam, $\gamma$-butyrolactam, etc.; and polyether polyols as synthesized from ethylene oxide, propylene oxide, butylene oxide, etc.

These polyols are reacted with isocyanate compounds, such as tolylene diisocyanate, hexamethylene diisocyanate, methylene diisocyanate, and methaxylylene diisocyanate, for urethanation to give polyester polyurethane or polyether polyuretahne. Or carbonation using phosgene or diphenylcarbonate gives polycarbonate polyurethane. Normally, these polyurethanes are mainly produced by the reaction of polyisocyanate and polyol. They may include urethane resin and urethane prepolymer having free isocyanate groups and/or hydroxyl groups and ones having no such reactive terminal groups, for example, those provided in the form of urethane elastomer.

Detailed description of processes of preparing polyurethane, urethane prepolymer, and urethane elastomer as well as methods of hardening and intermolecular linkage formation are omitted since these processes and methods are of prior art.

It is noted that in the present invention if the binder is additionally loaded with cellulose resin and/or vinyl chloride copolymer beside the above polyurethane and applied to the formation of the magnetic layer, the magnetic powder disperses better resulting in a higher mechanical strength of such layer. It is noted that though with cellulose resin and/or vinyl chloride copolymer alone the layer hardens excessively, inclusion of polyurethane can prevent such excessive hardness.

Applicable cellulose resins are cellulose ether, inorganic acid esters of cellulose, organic acid esters of cellulose, etc. Examples of cellulose ether are methyl cellulose, ethyl cellulose, propyl cellulose, isopropyl cellulose, butyl cellulose, methyl ethyl cellulose, methyl hydroxyethyl cellulose, ethyl hydroxyethyl cellulose, carboxymethyl cellulose, sodium salt of carboxymethyl cellulose, hydroxyethyl cellulose, benzyl cellulose, cyanoethyl cellulose, vinyl cellulose, nitrocarboxymethyl cellulose, diethylaminoethyl cellulose, aminoethyl cellulose, etc. Examples of inorganic acid esters of cellulose are nitrocellulose, cellulose sulfate, cellulose phosphate, etc. Further, examples of organic acid esters of cellulose are acetylcellulose, propionylcellulose, butyrylcellulose, methacryloylcellulose, chloroacetylcellulose, β-oxypropionylcellulose, benzoylcellulose, cellulose p-toluenesulfonate, acetylpropionylcellulose, acetylbutyrylcellulose, etc. Among these cellulose resins, nitrocellulose is preferably used. Concrete examples of such nitrocellulose are Celnova BTH1/2, Nitrocellulose SL-1 from Asahi Chemical Industry Co., Ltd., and Nitrocellulose RS1/2, Celline L-200 from Daicel Co., Ltd. The preferable range of the viscosity of nitrocellulose (as defined in JIS, K-6703 (1975)) is from 1/64 to 2 sec and particularly a range from ¼ to 1 sec is more preferable. Outside of this preferable range, the magnetic layer exhibits poor adhesion and strength of coating.

The above applicable vinyl chloride copolymers include one that is expressed by the following general formula:

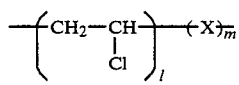

In this case, when estimated from the parameters l and m, the repeated monomer units

Figure 5:
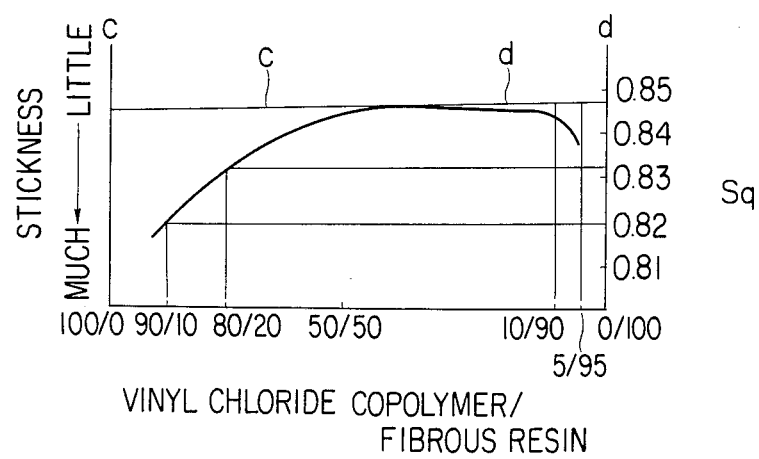
FIG. 5 is a curve showing dependency of the stickness and squareness ratio on the blending ratio of vinyl chloride copolymer and cellulose resin.

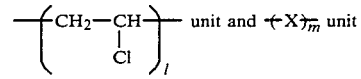

have molar percentages of 95 to 50 mole percent and 5 to 60 mole percent, respectively. X is a monomer component that can be copolymerized with vinyl chloride and it represents one or more monomer units selected from a group of compounds; vinyl acetate, vinyl alcohol, maleic anhydride, esters of maleic anhydride, maleic acid, maleic acid esters, vinylidene chloride, acrylonitrile, acrylic acid, acrylic acid esters, methacrylic acid, methacrylic acid esters, vinyl propionate, glycidyl methacrylate, glycidyl acrylate, etc. The degree of polymerization as expressed by (l+m) is preferably in a range from 100 to 600, for if this parameter does not reach the level of 100 the magnetic layer etc. is liable to get sticky while if it exceeds 600 there is an adverse effect on dispersibility. The above polyvinyl chloride copolymer may be partially hydrolized. A preferable example of the vinyl chloride copolymer is one that comprises vinyl chloride and vinyl acetate (hereinafter referred "vinyl chloride-vinyl acetate copolymer"). Examples of such vinyl chloride-vinyl acetate copolymer are vinyl chloride-vinyl acetate-vinyl alcohol copolymer, vinyl chloride-vinyl acetate-maleic anhydride copolymer, vinyl chloride-vinyl acetate-vinyl alcohol-maleic anhydride copolymer, vinyl chloride-vinyl acetate-vinyl alcohol-maleic anhydride-maleic acid copolymer, etc. Among vinyl chloride-vinyl acetate copolymers, those that are partially hydrolized are preferable for use. Concrete examples of such vinyl chloride-vinyl acetate copolymer are VAGH, VYHH, VMCH from Union Carbide Corp., S-LEC from Sekisui Chemical Co., Ltd., Denka Vinyl 1000G and 100W from Denki Gagaku Kogyo K.K., etc. Though the above vinyl chloride copolymer and cellulose resin may be used at any ratio, a weight ratio of 90/10 to 5/95 is preferable since it makes the magnetic layer less sticky and increases the squareness ratio as shown in FIG. 5.

Figure 6:
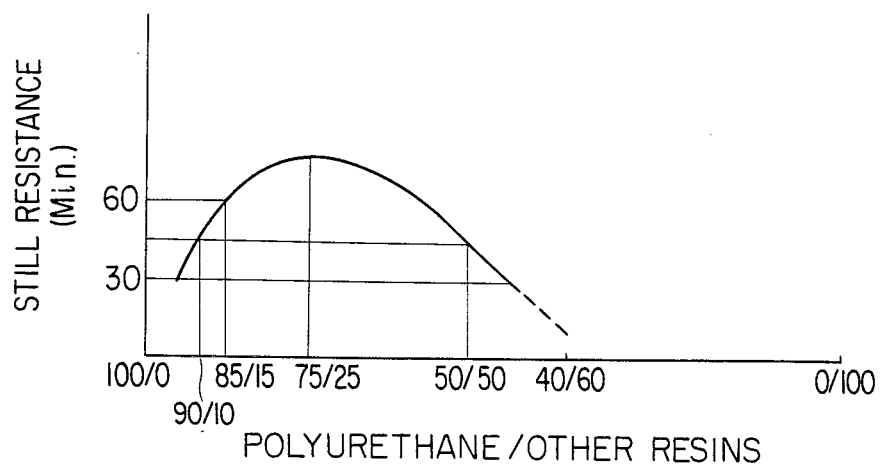
FIG. 6 is a curve showing dependency of the still resistance on the blending ratio of polyurethane and other resins.

It has been confirmed that in the entire formulation of the binder the weight ratio of the polyurethane and other resins, namely, the sum of cellulose resin and vinyl chloride copolymer is preferably 90/10 to 50/50 and more preferably 85/15 to 60/40 as shown in FIG. 6. If the polyurethane is increased beyond the upper limit of the above range, there appears a tendency of poor dispersibility to make the still resistance lower while an excessive increase in other resins often causes poor surface characteristics and lower still resistance and particularly if the amount of these resins exceeds 60 weight percent, the coating generally exhibits rather unfavorable physical properties.

The magnetic layer of the magnetic recording medium embodying the invention is preferably further loaded with two kinds of carbon black as hereinafter referred to by symbols CB1 and CB2, respectively. The specific surface area (BET value) of the former B1 is in the range of $40\ m^2/g < B1 < 200\ m^2/g$, and the one of the latter B2 in the range of $200\ m^2/g < B2 \leq 500\ m^2/g$.

It is generally known that if electrostatic charges accumulate on the magnetic recording medium during its use they are liable to be discharged to the magnetic head to generate noises and further there sometimes occurs adsorption of dust or the like to cause a drop-out trouble. On the other hand, in case of magnetic recording medium for video application, there is known a technique to detect the difference in the optical transmission of tape between the tape section carrying the magnetic layer and the leader tape section to monitor and adjust the tape running speed. Because of the above reasons, it is generally considered necessary to have the surface electric resistance of the magnetic layer not higher than $10^3$ ohm.cm and the optical transmission of the tape section carrying such layer not higher than 0.05%. To satisfy the above requirements, the magnetic layer is normally loaded with powdered carbon blacks.

The carbon black preparations CB1 and CB2 as mentioned above are effective for such use. The carbon black CB1 is primarily added for light interception. It is very important that its specific surface area B1 is limited to the range 40 m$^2$/g < B1 < 200 m$^2$. A specific surface area, if selected in this range, can not only make the magnetic layer capable of fully intercept light but increase the dispersibility of carbon black CB1 in the layer. Below the lower limit of the above range or 40 m$^2$/g, carbon black grains are often too large in size to effectively intercept light and therefore it becomes necessary to increase the addition unnecessarily while beyond the upper limit 200 m$^2$/g, grains are often too small to be satisfactorily dispersed in the layer. Beside CB1, another carbon black preparation CB2 is added to increase the electrical conductivity fully. It is important to limit its specific surface area B2 in a range from 200 m$^2$/g < B2 < 500 m$^2$/g, for if the specific surface area of CB2 is lower than 200 m$^2$/g grains are too large in size to increase the conductivity satisfactorily while if this parameter is higher than 500 m$^2$/g grains are so small that CB2 is rather liable to disperse poorly.

By confining the specific surface areas of light intercepting carbon black CB1 and conductive carbon black CB2 in the particular ranges as specified above, therefore, the surface electric resistance and light transmission of the magnetic layer, etc. may be satisfactorily lowered and the surface smoothness of the layer, namely, the dispersion of the carbon black be improved while the durability of the layer being increased in spite of a moderate amount of carbon black added. The ranges of specific surface area specified for these carbon black preparations are basically different from those of prior art. It is noted that preferable ranges of the above specific surface areas are $100 \leq B1 < 200$ and $200 \leq B2 < 300$. Corresponding to the ranges of specific surface area as specified above, the grain size of CB1 and CB2 is preferably 20 μm or under and 40 to 50 μm, respectively.

The carbon black is added in such an amount that the mechanical strength of the magnetic layer may be maintained. Normally, it must account for 5 to 35 weight percent and preferably 10 to 25 weight percent of the binder. As far as the specific surface areas of carbon black preparations are confined in the above ranges, it need not increase the amount of carbon black to be added beyond the aforementioned range of 5 to 35 weight percent. The magnetic layer can thus maintain its satisfactory mechanical properties, for example, minimizing blooming of magnetic layer while the preferable surface electric resistance of $10^9$ ohm.cm or under and light transmission of 0.05% or under be achieved.

Use of carbon black of a small grain size or larger surface area is not preferable for the following reason. Though when compared with the same carbon black content on weight basis it is advantageous because it decreases the specific surface resistance and light transmission of the coating, it is difficult to disperse in the coating and poor dispersion gives a rougher surface and produces pinholes, contrariwise causing increases in the specific surface resistance and light transmission and deterioration of the characteristic of electromagnetic signal conversion. Needle-like magnetic grains are rather liable to break during dispersion, so excessive agitation for dispersion breaks these grains to lower the characteristic of electromagnetic signal conversion substantially. When magnetic powder is dispensed for application to the magnetic layer, the agitation is normally stopped when the maximum dispersion of the powder is attained. In this case, carbon black of low dispersibility, if used, sometimes fails to achieve satisfactory dispersion, resulting in its isolation from the paint mass, rough surface of coating, pinholes, etc. These difficulties can be effectively prevented by use of the carbon black preparations of the invention.

In the invention, the conductive carbon black CB2 is preferably used to lower the specific surface resistance of the magnetic layer, etc. to a satisfactory range. Primary grains of this carbon black are preferably clustered, so to say, botryoidally. Namely, carbon black of high structural level that is porous having a large specific surface area is preferable for use. Examples of such carbon black are Conductex 975 and 950 having a specific surface resistance of 270 and 245 m$^2$/g, respectively, and the same grain size of 46μ from Columbia Carbon Corp., Vulcan XC-72 with a specific surface area of 257 m$^2$/g and a grain size of 18μ from Cabot Corp. Though having a larger specific surface area, in applying to the magnetic layer, these carbon black products can be fully dispersed before the completion of the magnetic powder dispersion. Though CB2 whose specific surface area exceeds the upper limit 500 m$^2$/g of the above specified range gives higher conductivity and light interception when dispersed completely, it does not complete dispersion even at a time when the magnetic powder is fully dispersed. This is liable to cause a rough surface of the coating and pinholes. On the other hand, CB2 whose specific surface area does not reach 200 m$^2$/g, when used, gives weaker effects.

To lower the light transmission of the magnetic layer, the carbon black CB2 as mentioned above can also be used. If added, however, a small amount of carbon black CB1 that performs more favorably in the light interception though with a lower electric conductivity and disperses excellently having a smaller specific surface area than the primarily conductive carbon black gives remarkable synergic effects as compared to use of the conductive carbon black alone. Namely, addition of the light intercepting carbon black CB1 together with the conductive carbon black CB2 can reduce the light transmission satisfactorily while reducing the amount of the latter substantially. The total amount of carbon black added is thus reduced, which improves the mechanical properties of the magnetic layer and the surface smoothness. For the above light intercepting carbon black CB1, there can be used a preparation of lower structural level that has a smaller grain size in spite of a smaller specific surface area. Examples of such carbon black preparation are Raven 2000 with the specific surface area of 180 m$^2$/g and grain size of 19 μm, and further Raven 2100, 1170, 1000 from Columbia Carbon Corp., carbon black #100, 75, 44, 40, 35, 30, etc. from Mitsubishi Chemical Industries, Ltd.

The blending ratio by weight of the above carbon black preparations is selected in a certain range that is preferably from CB2/CB1=90/10 to 50/50 and more preferably from 80/20 to 60/40. At a blending ratio higher than 90/10 the ratio of the conductive carbon black CB2 increases too much to achieve satisfactory light interception while at a blending ratio lower than 50/50 the specific surface resistance increases unfavorably.

Figure 7:
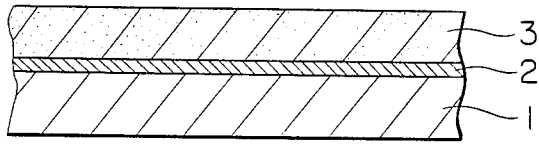
FIGS. 7 and 8 are expanded partial sectional views of two examples of magnetic medium.

FIG. 7 shows a magnetic recording medium, for example, magnetic tape embodying the invention in which a subbing layer 2 which may be omitted as adequate and a magnetic layer 3 are laminated successively on one side of base 1. According to the invention, the magnetic layer 3 is loaded with magnetic powder surface treated as mentioned above.

It is noted that for the magnetic powder used in the invention, particularly, various kinds of ferromagnetic powder, for example, the iron oxide ferromagnetic powder and metal ferromagnetic powder based on iron, nickel and/or cobalt may be used. Examples of such iron oxide ferromagnetic powder are $\gamma$-$Fe_2O_3$, Co-deposited $\gamma$-$Fe_2O_3$, $Fe_3O_4$, and Co-deposited $Fe_3O_4$ while examples of such metal ferromagnetic powder are those individually based on Fe, Ni, Co, Fe-Ni-Co alloy, Fe-Mn-Zn alloy, Fe-Ni-Zn alloy, Fe-Co-Ni-Cr alloy, Fe-Co-Ni-P alloy, Co-Ni alloy, etc. In case of the metal ferromagnetic powder, the route ⓒ of FIG. 1 may be used for its treatment with the aforementioned copolymer.

The magnetic paint involved in the present invention is prepared by kneading and dispersing magnetic powder pretreated with such copolymer, and binder, carbon black preparations as mentioned above, the above copolymer, which is added to improve the dispersibility though it may be omitted because it is already used for the treatment of the magnetic powder, etc. in the paint solvent. The magnetic paint thus prepared is coated on the base to form the magnetic layer of the magnetic recording medium embodying the invention.

Binders that are applicable to the magnetic layer of the invention were already mentioned. They may be used alone or by mixing with a thermoplastic resin, thermosetting resin, reactive resin, and/or electron radiation curing resin.

The applicable thermoplastic resin softens at 150° C. or under, has a mean molecular weight between 10,000 and 200,000 and a degree of polymerization between about 200 to 2,000. Examples of such thermoplastic resin are acrylic ester-acrylonitrile copolymer, acrylic ester-vinylidene chloride copolymer, acrylic ester-styrene copolymer, methacrylic ester-acrylonitrile copolymer, methacrylic ester-vinylidene chloride copolymer, methacrylic ester-styrene copolymer, polyvinyl fluoride, vinylidene chloride-acrylonitrile copolymer, acrylonitrile-butadiene copolymer, polyamide resin, polyvinyl butyral, styrene-butadiene copolymer, polyester resin, chlorovinyl ether-acrylic ester copolymer, amino resin, and various kinds of thermoplastic synthetic rubber, and mixtures thereof.

These resins are disclosed in Japanese Patent Opening Nos. 6877-1962, 12528-1964, 19282-1964, 5349-1965, 20907-1965, 9463-1966, 14059-1966, 16985-1966, 6428-1967, 11621-1967, 4623-1968, 15206-1968, 2889-1969, 17947-1969, 18232-1969, 14020-1970, 14500-1970, 18573-1972, 22063-1972, 22064-1972, 22068-1972, 22069-1972, 22070-1972, 27886-1973, U.S. Pat. Nos. 3,144,352, 3,419,420, 3,499,789, and 3,713,887.

The thermosetting resin and reactive resin have a molecular weight of 200,000 or under when provided in the form of coating solution. After drying, their molecular weights increase infinitely because of reactions, such as condensation and addition. They preferably neither soften nor melt up to a temperature at which they are thermally decomposed. Examples of these resins are phenol resin, epoxy resin, urea resin, melamine resin, alkyd resin, silicon resin, reactive acrylic resin, mixture of methacrylate copolymer and diisocyanate prepolymer, urea-formaldehyde resin, polyamine resin, and mixtures thereof.

These resins are disclosed in Japanese Patent Opening Nos. 8103/1964, 9779/1975, 7192/1966, 8016/1976, 14275/1966, 18179/1967, 12081/1968, 28023/1969, 14501/1970, 24902/1970, 13103/1971, 22067/1972, 22072/1972, 22073/1972, 28045/1972, 28048/1972, 28922-1972, U.S. Pat. Nos. 3,144,353, 3,320,090, 3,437,510, 3,597,273, 3,781,210 and 3,781,211.

The electron radiation curing resin is an unsaturated prepolymer or polyfunctional monomer. Examples of such prepolymer are those of maleic anhydride type, urethaneacrylic type, polyester-acrylic type, polyether-acrylic type, polyurethane-acrylic type, polyamide-acrylic type, etc. while examples of the polyfunctional monomer are those of etheracrylic type, urethane-acrylic type, phosphate ester-acrylic type, aryl type, hydrocarbon type, etc.

It is noted that in the present invention the binder is preferably used 5 to 60 parts by weight in total per 100 parts by weight of magnetic powder in consideration of the recording density, mechanical strength, etc.

In order to improve the durability of the magnetic recording medium, the magnetic layer may further be loaded with one or more of various hardeners, for example, isocyanates.

Examples of the applicable aromatic isocyanate hardener are tolylene diisocyanate (TDI), 4,4'-diphenylmethane diisocyanate (MDI), xylylene diisocyanate (XDI), methaxylylene diisocyanate (MXDI), and their adducts with an active hydrogen compound. They preferably have a molecular weight between 100 and 3,000.

Concrete product examples are Sumidur T80, 44S, PF, L, Desmodur T65, 15, R, RF, IL, SL from Sumitomo Bayer Urethane Co., Ltd., Takenate 300S, 500 from Takeda Chemical Industries Co., Ltd., NDI, TODI from Mitsui-Niso Urethane Co., Ltd., Desmodur T100, Milionate MR, MT, Coronate L from Nihon Polyurethane Co., Ltd., PAPI-135, TD165, 80, 100, Isonate 125M, 143L from Kasei Upjohn Co., Ltd.

Examples of the applicable aliphatic isocyante hardener are hexamethylene diisocyanate (HMDI), lysine diisocyanate, trimethylhexamethylene diisocyanate (TMDI), and their adducts with an active hydrogen compound. These aliphatic isocyanates and their adducts preferably have a molecular weight in a range from 100 to 3,000. Among aliphatic isocyanates, particularly, alicyclic isocyanates and their adducts with an active hydrogen compound are preferable for use.

Concrete product examples are Sumidur N, Desmodur Z4273 from Sumito Bayer Urethane Co., Duranate 50M, 24A-100, 24A-90CX from Asahi Chemical Industry Co., Ltd., Coronate HL from Nihon Polyurethane Co., Ltd., TMDI from Huels Corp., etc.

Examples of alicyclic isocyanates that are among preferable aliphatic isocyanates are methylcyclohexane-2,4-diisocyanate and 4,4'-methylenebis(cyclohexylisocyanate) as expressed by the following structural formulas

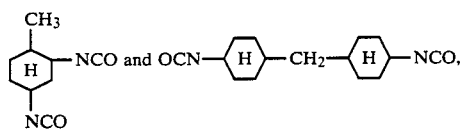

respectively, isophorone diisocyanate, and their adducts with an active hydrogen compound.

Concrete product examples are IPDI, IPDI-T1890, -H2921 and -B1065 from Huels Corp., etc.

The magnetic recording medium of the invention is fabricated, for example, by the following process. Magnetic powder, binder and various other additives are mixed and dispersed in an organic solvent to prepare a magnetic paint. After addition of one or more compounds as selected among the above organic isocyanates and aliphatic isocyanates, the paint is coated on base, for example, polyester film and, if necessary, dried to form the magnetic recording medium.

Combined use of the aromatic isocyanate type with the aliphatic isocyanate type is preferable in maintaining the properties of the paint that are convenient for coating and also improving the physical properties of the magnetic layer formed.

The isocyanate is added to the binder in an amount that corresponds to 1 to 100 weight percent of the latter. With less than 1 weight percent the magnetic layer often hardens unsatisfactorily while with more than 100% the layer is often sticky after hardening. To have a more preferable magnetic layer, the isocyanate is added in an amount that corresponds to 5 to 30 weight percent of the binder.

The magnetic paint used to form the above magnetic layer may be loaded with other dispersant, lubricant, abrasives, and other additives, for example, antistatic agent, as necessary.

Other dispersants that may be used are selected among fatty acids having 8 to 18 carbon atoms as expressed by a general structural formula R—COOH where R is a saturated or unsaturated aliphatic group of 7 to 17 carbon atoms, and metal soaps made by reacting the above aliphatic acids with alkali metals, Li, Na, K, etc. or alkaline earth metals, Mg, Ca, Ba, etc. Beside, higher alcohols having 12 or more carbon atoms and their sulfate esters may be used. Further, common surfactants that are commercially available may also be used. These dispersants may be used independently or in combination. For the lubricant, silicone oil, graphite, molybednum disulfide, tungsten disulfide, fatty acid esters of 21 to 23 carbon atoms, each comprising a monobasic fatty acid of 12 to 16 carbon atoms and a monohydric alcohol, etc. They are added 0.2 to 20 parts by weight per 100 parts by weight of magnetic powder.

For the applicable abrasives, materials that are generally applied as such may be used. Examples of such materials are fused alumina, silicon carbide, chromium oxide, natural corundum, synthetic corundum, natural diamond, synthetic diamond, garnet, emery that is based on corundum and magnetite, etc. These abraisive materials have a mean grain size between 0.05 and 5$\mu$ and preferably between 0.1 to 2$\mu$ for use. They are added 1 to 20 parts by weight per 100 parts by weight of the magnetic powder.

Among other additives applicable, examples of the antistatic agent are conductive powders individually based on graphite, tin oxide-antimony oxide compound, titanium oxide-tin oxide-antimony oxide compound, etc.; natural surfactant such as saponin; nonionic surfactants based on alkylene oxide, glycerin, glycidol, etc.; cationic surfactants based on higher alkylamines, quaternary ammonium salt, pyridine and other heterocyclic compounds, phosphonium compounds, sulfonium compounds, etc.; anionic surfactants having acidic groups, for example, carboxyl group, sulfonic group, phosphonic group, sulfonate ester group, phosphate ester group, etc.; amphoteric surfactants based on amino acids, aminosulfonic acids, sulfate and phoshpate esters of aminoalcohols, etc.

Examples of the solvent of magnetic paint and one added, as adequate, to the magnetic paint before application are acetone, methyl ethyl ketone, methyl isobutyl ketone, cyclohexanone and other ketones; methanol, ethanol, propanol, butanol and other alcohols; methyl acetate, ethyl acetate, butyl acetate, ethyl lactate, ethylene glycol monoacetate, and other esters; ethylene glycol dimethyl ether, diethylene glycol monoethyl ether, dioxane, tetrahydrofuran, and other ethers; benzene, toluene, xylene and other aromatic hydrocarbons; methylene chloride, ethylene chloride, carbon tetrachloride, chloroform, dichlorobenzene, and other halogenated hydrocarbons.

Further, materials applicable as the base include the following examples: polyethylene terephthalate, polyethylene-2,6-naphthalate, and other polyesters; polypropylene and other polyolefines; cellulose diacetate, cellulose triacetate, and other cellulose derivatives; polycarbonate and other plastic resins; aluminium, zinc, and other metals; and glass, boron nitride, silicon carbide, porcelain, earthenware, and other ceramics.

The base made of one of these materials is about 3 to 100 $\mu$m thick and preferably 5 to 50 $\mu$m thick in case of film or sheet and 30 $\mu$m to 10 mm thick in case of disc or card. In case of drum, the base is worked in a cylindrical configuration that fits the recorder to be used with.

Figure 8:
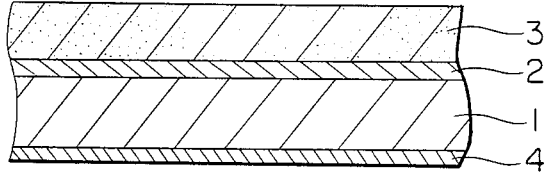

To prevent electrostatic charging, transfer of the magnetic layer, etc., the other side of the above base that is opposite to the magnetic layer is given a so-called "backcoat" 4 as shown in FIG. 8.

Available coating methods by which the base can be coated with the aforementioned magnetic paint for formation of a magnetic layer include air doctor coating, blade coating, air knife coating, squeeze coating, dip coating, reverse roll coating, transfer roll coating, gravure coating, kiss coating, cast coating, and spray coating though other methods will be apparent to those skilled in the art.

The magnetic layer formed by coating on the base by one of the methods as mentioned above is dried after being subjected, as necessary, to a process step to orient magnetic powder in the layer. Further, it is worked for smoother surface and cut into a desirable configuration, as necessary, to give a magnetic recording medium embodying the invention.

It was found that use of magnetic powder having a specific surface area of 30 m$^2$/g or over preferably with a smaller grain size increases the S/N ratio of the medium. Though with such a high specific surface area the magnetic powder becomes less dispersible, its surface treatment with the aforementioned copolymer prevents poor dispersion, even improving its own dispersibility. Namely, such copolymer uses a monomer component having an anionoid organic group or groups in the form of salt in its molecule, so while the hydrocarbon residue of the copolymer mixes well with the binder, these anionoid groups in the form of salt are fully bound to the hydrophilic surface of magnetic grains particularly when these grains are treated with the above copolymer in an aqueous system, for the salt of these anionoid groups has a dissociation constant that is adequately higher than their free form without salt formation. In this way, the copolymer is fully bound to the surface of magnetic grains while mixing well with the binder of the magnetic layer. Even with a specific surface area of 30 $m^2/g$ or over, therefore, the magnetic powder that is treated with such copolymer has a substantially higher dispersibility, resulting in remarkable improvements in performances, such as the squareness ratio and playback output.

It is noted that the term "specific surface area" as used herein means the surface area per unit weight. It is thus a physical parameter that is quite different from the mean grain size. For example, two powdery preparations of the same mean grain size may differ substantially in the specific surface area. The specific surface area is measured, for example, by the following method. First, the magnetic powder is heated 30 to 60 minutes around 250° C. for deaeration to remove air adsorbed on the powder. A sample is then taken, with which a measuring instrument is loaded. Under the initial pressure of nitrogen gas of 0.5 $kg/m^3$, nitrogen gas adsorption is measured at the liquid nitrogen temperature $-195°$ C. (this is the so-called BET method for measuring the specific surface area; see J. Ame. Chem. Soc., 60 309 (1938) for further detail). For the measuring instrument to measure this specific surface area (BET value), a powder measuring instrument "Countersorp" as jointly manufactured by Yuasa Battery Co., Ltd. and Yuasa Ionics Co., Ltd. may be used. The specific surface area and its measuring methods are described in detail in "Measurements of Powder" originally written by J. M Dallavalle and Clyde Orr Jr., translated by Benda, etc. and published by Sangyo Tosho Co., Ltd. A description on this subject is also given in pp. 1170–1171, Chemical Handbook, Application Part as compiled by Chemical Society of Japan and published by Maruzen Co., Ltd. on Apr. 30, 1966. (It is noted that in the above Chemical Handbook the "specific surface area" as defined herein is just called "surface area ($m^2/g$)".

The magnetic powder can be surface treated with the aforementioned copolymer by adding an aqueous solution of the latter to the former, kneading the mixture on a kneader or the like for a given time and further removing the moisture from the mixture by filtration and/or drying. After filtration and/or drying, the treated magnetic powder is pulverized to a desirable grain size for classification. An alternative method is to dissolve the above copolymer in a solvent, for example, toluene, methyl ethyl ketone, ethyl cellosolve, acetone, or methanol, dip such an amount of magnetic powder in the resultant solution that the powder and dissolved copolymer are present at a given ratio in the solvent, agitate the mixture for mixing, filter out the magnetic powder or evaporate the solvent, and, if necessary, further dry the powder.

Figure 9:
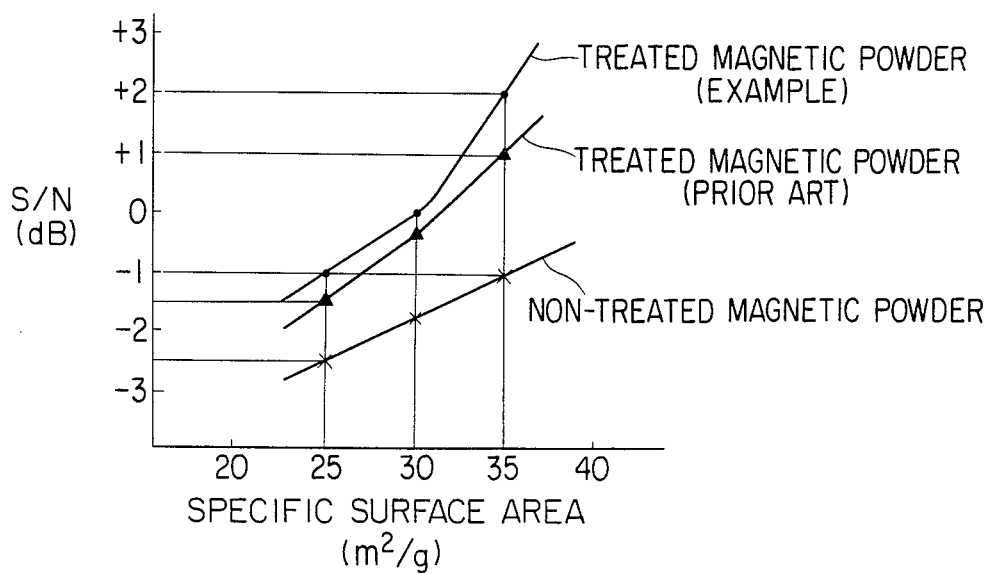
FIG. 9 is a curve showing the dependency of the output S/N ratios achieved with different kinds of magnetic powder on the specific surface area of magnetic powder.

It has been found that if magnetic powder to be surface treated has a specific surface area of 30 $m^2/g$ or over, the expected effects of the surface treatment with the copolymer as mentioned above are fully exhibited. Namely, with a specific surface area of 30 $m^2/g$ or over, the magnetic powder is grained small, so it has a tendency of inferior dispersion though the magnetic characteristics are improved with respect to the high density recording. As shown in FIG. 9, even without any surface treatment of the magnetic powder, the characteristics of the resultant magnetic recording medium are improved to a certain degree by increasing the specific surface area of such powder and these characteristics are further improved with magnetic powder that is surface treated with a copolymer of prior art wherein the organic group of the monomer unit A as mentioned above is just the free carboxyl group —COOH, but in these cases there is only a linear improvement with an increasing specific surface area of magnetic powder. By contrast, it was confirmed that magnetic powder surface treated with a copolymer according to the invention, namely, treated magnetic powder, if used, exhibits drastic improvements in characteristics as compared to the magnetic powder of prior art in a range of the specific surface area of magnetic powder not lower than 30 $m^2/g$. This finding gives a true account of a fact that lowering in the dispersibility of the magnetic powder with a specific surface area of 30 $m^2/g$ or over is not only effectively compensated for by the surface treatment with a copolymer according to the invention but this dispersibility is substantially improved by using the copolymer in the form of salt. It is noted however that the specific surface area of the magnetic powder used is preferably limited to 100 $m^2/g$ since an unnecessarily high value of this parameter rather causes poor dispersion.

Meanwhiles, the binder to bind the magnetic powder has hitherto been variously investigated. For example, it has been proposed to use a binder that is prepared by kneading urethane resin with cellulose resin that performs excellently as a dispersant of magnetic powder.

With this binder, however, its urethane component is prepared by reacting a polyol, such as polyester or polyether, with a polyisocyanate in the magnetic layer formed on the base by coating, so there occurs a gradual reaction of polycyanate during the process. As a result, not only the coating is often formed weak but the coating made of such binder fails to exhibit a satisfactory wearproof performance.

By contrast, in the Japanese Patent Opening No. 1641/1978, based on a recognition that soft polyurethane intermixes well with hard polyurethane and cellulose resin to plasticize the mixture of these two hard resins and the resultant interaction between these three resins allows formation of a tough coating, use of a magnetic coating is proposed which is prepared by binding magnetic powder with a binder comprising a hard thermoplastic polyurethane resin and cellulose resin, both having a hardness of 30 to 100 $kg/cm^2$ at 100% modulus, and soft thermoplastic polyrurethane resin having a hardness of 20 $kg/cm^2$ or under at 100% modulus.

Figure 10:
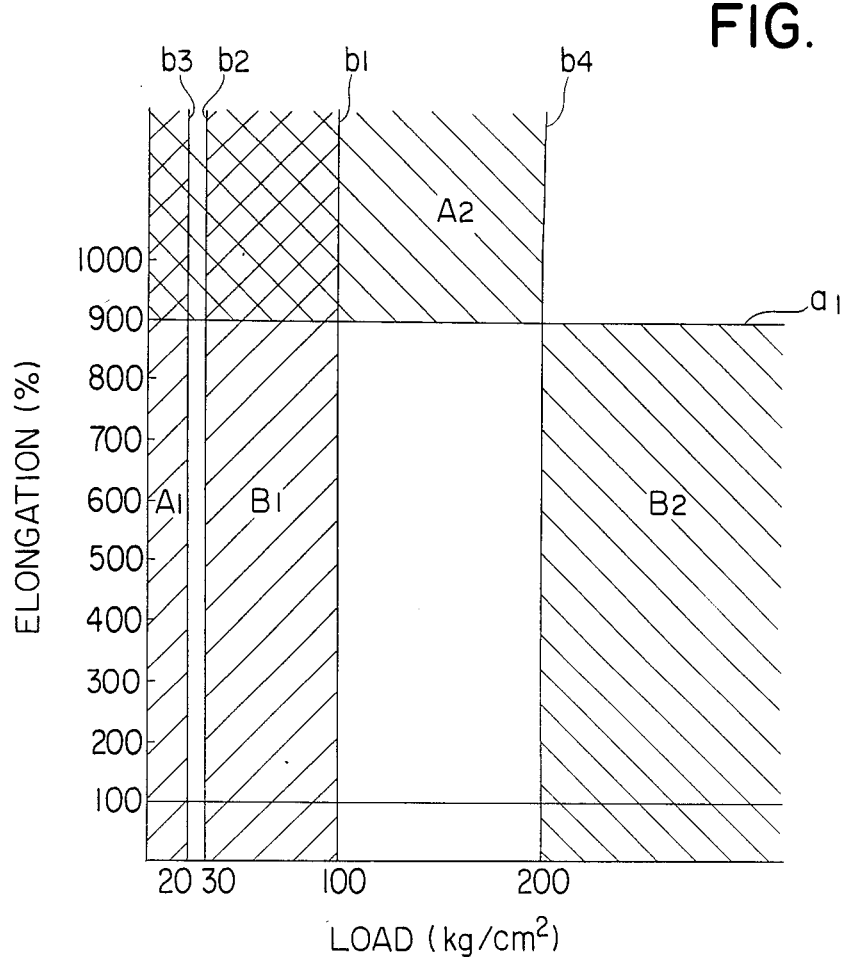
FIG. 10 is a graph used to characterize various kinds of polyurethane in terms of their behavior in the percentage elongation (breaking elongation) versus the load (tensile strength).

In the above binder formulation of prior art, the hard thermoplastic polyurethane resin belongs, in the load ($kg/cm^2$) versus percentage elongation diagram of FIG. 10, to the region B1 between the line b1 corresponding to a load of 100 $kg/cm^2$ and the line b2 corresponding to a load of 30 $kg/cm^2$ while the soft thermoplastic polyurethane resin to the region A1 between the line corresponding to the vanishing load and the line b3 corresponding to a load of 20 $kg/cm^2$. Since the polyurethane resin belonging to the region B1 and one to the region A1 do not differ much in hardness, changes in the mixing ratio of these two resins give control of the properties of magnetic coating only in a limited range and the coating hardens only unsatisfactorily, thus exhibiting high stickiness after hardening. Further, interdispersibility of these resins is not high enough, so the resultant magnetic recording medium is not good enough in the wearproof performance, durability, and surface characteristics. Thus, there has not been available any magnetic recording medium that performs satisfactorily with respect to blooming, dropping, dropout, video S/N ratio, and chroma S/N ratio.

By contrast, it was found that use of two kinds of polyurethane as binder, a soft polyurethane with the tensile strength below 200 kg/cm$^2$ and the breaking elongation of 900% or over and a hard polyurethane with the tensile strength of 200 kg/cm$^2$ or over and the breaking elongation below 900%, and magnetic powder surface treated with the aforementioned copolymer in the magnetic layer gives favorable effects.

Figure 11:
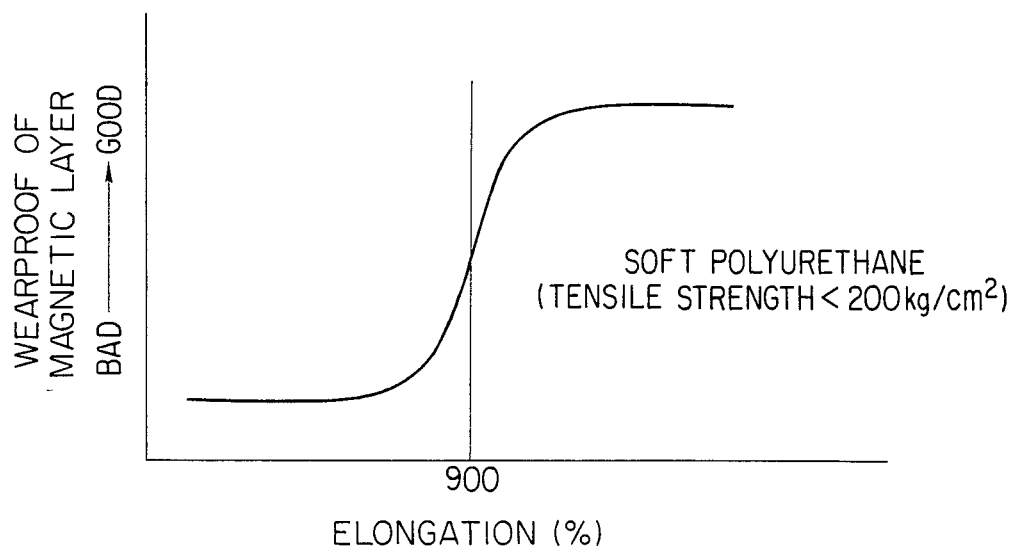
FIG. 11 is a curve showing the dependency of the wearproof performance of the magnetic layer on the percentage elongation of the soft polyurethane used.
Figure 12:
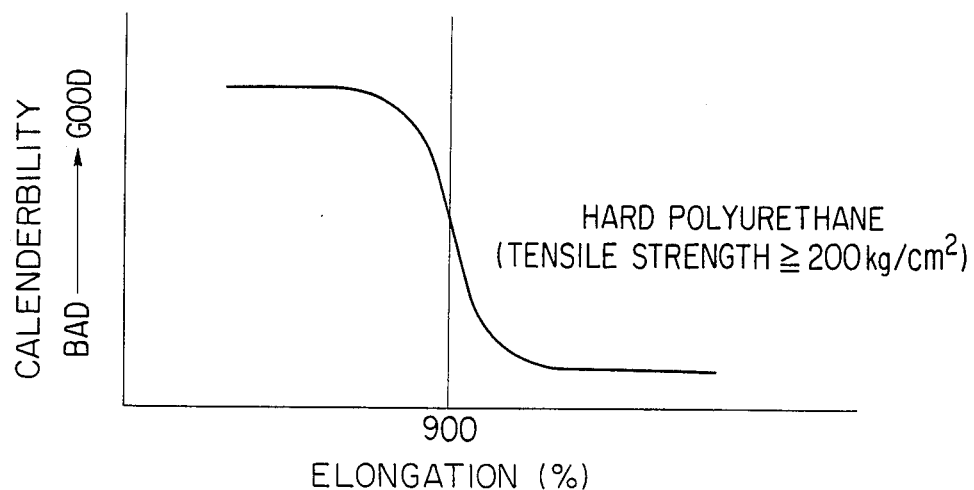
FIG. 12 is a curve showing the dependency of the calenderability on the percentage elongation of the hard polyurethane used.

Namely, the presence of the above soft polyurethane in the magnetic layer eases calendering and improve the adhesion of the layer while the presence of the above hard polyurethane in the layer prevents the defects that might have occurred if the soft polyurethane were used alone, namely, prevents the stickiness and a lowering in the stiffness to suppress the sticky performance of the medium and make it stiffer. To have these soft and hard polyurethane effectively exert their own features, the present invention has specified above the allowable ranges of mechanical parameters for each kind of polyurethane, which gives a very important meaning to the invention. In other words, if a soft polyurethane whose tensile strength and breaking elongation are below 200 kg/cm$^2$ and 900% or over, respectively, is used to give the aforementioned effects of soft polyurethane fully and at the same time a hard polyurethane whose tensile strength and breaking elongation are 200 kg/cm$^2$ or over and below 900%, respectively, is used to have sufficiently large differences in these mechanical parameters between the two kind of polyurethanes, properties of the magnetic layer comprising the magnetic recording medium can be adjusted widely. As a result, while suppressing the stickiness, there can be achieved the wearproof performance and durability of the medium, as well as high dispersibility of the binder components resulting in favorable surface characteristics. FIG. 11 shows how the wearproof performances (liability to scratching and resistance to blooming) of the magnetic layer depend on the breaking elongation of the soft polyurethane whose tensile strength is below 200 kg/cm$^2$. It is found that the elongation over 900% improves the performances remarkably. On the other hand, FIG. 12 shows how the ease of calendering with the medium depends on the elongation of the hard polyurethane whose tensile strength is 200 kg/cm$^2$ or over. It is found that the elongation below 900% improves the performance concerned drastically.

The preferable ranges of the physical parameters of the above two polyurethanes are: 10 to 100 kg/cm$^2$ and 1000 to 1200% for the tensile strength and breaking elongation, respectively, of the soft polyurethane and 300 to 600 kg/cm$^2$ and 400 to 750% for the tensile strength and breaking elongation of the hard polyurethane.

If these two polyurethanes are characterized in mechanical properties with reference to FIG. 10, one of the two regions whose boundaries are defined by the line b4 corresponding to a load of 200 kg/cm$^2$ and the line a1 corresponding to an elongation of 900%, namely, the region B2 can be assigned to the hard polyurethane and the other region A2 to the soft polyurethane.

The definition of the Mechanical properties, tensile strength and breaking elongation of the above polyurethanes conforms to JIS K6301-1975 where the breaking elongation is called "elongation on breaking".

Beside use of the above two kinds of polyurethane, another important structural feature herein is that the magnetic powder is pretreated with the copolymer as mentioned above. Namely, since this copolymer has anionoid organic groups in its monomer units in the form of salt, the hydrocarbon residue of the copolymer mixes well with the binder while such groups that are provided in the form of salt and have an adequately high dissociation constant as compared to the free form of these groups, dissociate to be bound fully to the hydrophilic surfaces of magnetic grains particularly when these grains are treated with the copolymer concerned in an aqueous system. Since these groups are more hydrophilic in the form of salt than in the free form, the copolymer is less liable to be stripped off and transferred to the binder-solvent phase as the surface treated magnetic powder is dispersed in the binder-solvent system. For this reason, the above copolymer is fully bound to the surface of magnetic powder without being stripped off while it mixes well with the binder of the magnetic layer. Therefore, the magnetic powder that is treated with the above copolymer becomes much more dispersible and exhibits remarkable improvements in characteristics, such as the squareness ratio, output, surface oozing, etc.

In the magnetic recording medium embodying the invention, the soft and hard polyurethanes used for the binder of the magnetic layer can be synthesized by reacting the polyol and polyisocyanate as mentioned above.

In such synthesis, the polyurethane can be prepared soft or hard depending on the formulation. For example, a soft polyurethane can be prepared by including two or more different polyester polyol components at random in individual molecules or by using an isocyanate in which the molecular chain between its isocyanate groups is an unbranched aliphatic hydrocarbon chain.

A hard polyurethane can be prepared, for example, by using a single polyol type, increasing the amount of isocyanate added, or using an isocyanate readily crystallizable or having a benzene ring in its molecule.

Figure 13:
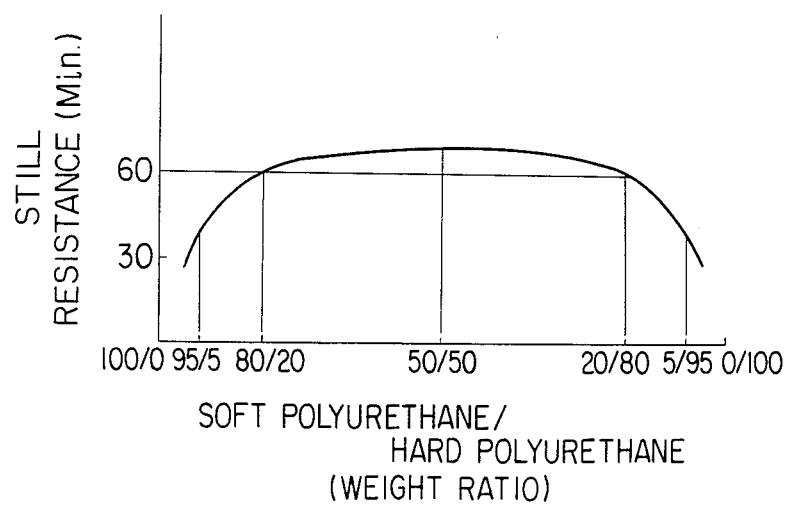
FIG. 13 is a curve showing the dependency of the still resistance on the blending ratio of the soft and hard polyurethane.

Though these two kinds of polyurethane can be used in combination at an arbitrary ratio, it was found that this ratio has a certain preferable range. As suggested from FIG. 13, the ratio by weight of soft polyurethane: hard polyurethane is preferably selected in the range of 80:20 to 20:80 and more preferably 70:30 to 30:70 in consideration of the still resistance.

The invention will be understood more readily with reference to the following examples though variations may be made in components, ratios, process sequences, etc. without departing from the spirit and scope of the invention. It is noted that in these examples the term "parts by weight" is always abbreviated to "parts".

EXAMPLE 1

Co-deposited $\gamma$-Fe$_2$O$_3$ or Co-$\gamma$-Fe$_3$O$_3$ was filtered and washed. The moist Co-$\gamma$-Fe$_2$O$_3$ was emulsified in an aqueous solution of a copolymer of the invention composed of monomer units A and B, the former being an alkylene derived from maleic anhydride with two carboxyl groups thereon provided in the form of quaternary ammonium salt and the latter being diisobutylene. This solution was prepared by dissolving 21 parts of the copolymer in 79 parts of water. After the pH value of adsorption bath was adjusted to 7 by addition of sulfuric acid, the bath was agitated 1 hour at room temperature. Thereafter, unadsorbed copolymer was removed from the magnetic powder by filtration and washing with water. 0.8 g of copolymer was thus adsorbed per 100 g of magnetic powder. The powder was then dried and sieved.

Next, a magnetic paint of the following formulation was prepared:

| | | |
|---|---|---|
| Surface treated Co—$\gamma$-F$_{F}$2O3 | 100 | parts |
| Polyurethane "Nipolan N-2304" | 10 | parts |
| Vinyl chloride-vinyl acetate copolymer "S-LEC-A" | 10 | parts |
| Myristic acid | 0.5 | parts |
| Palmitic acid | 0.5 | parts |
| Al2O3 | 4.0 | parts |
| Conductive carbon black "Vulcan XC-72" | 5.0 | parts |
| Hardener "Coronate L" | 5.4 | parts |

The magnetic paint was passed through a filter of mean pore size of 1 $\mu$m. The magnetic paint thus prepared was coated on 15 $\mu$m thick polyester film by a reverse roll coater under application of a magnetic field. It was then dried, resulting in a 5 $\mu$m thick dry coating. Next, the surface of the magnetic layer was calendered by a super calender roll, which gave a wide magnetic film web having a magnetic layer of a given thickness. This film was slit at intervals of ½ inch to prepare video tape.

EXAMPLE 2

Magnetic tape was prepared by the same method as in Example 1 except that magnetic powder was surface treated in the adsorption bath whose pH was adjusted to 6.

EXAMPLE 3

Magnetic tape was prepared by the same method as in Example 1 except that 1 part of lecitin powder was added to the magnetic paint per 100 parts of the magnetic powder.

EXAMPLE 4

Magnetic tape was prepared by the same method as in Example 1 except that Co-deposited $\gamma$-Fe2O3 powder was dried, aqueous solution of the copolymer as used in the same Example was added thereto, pH was then adjusted to 6 for adsorption, and the filtered and dried treated powder was pulverized before sieving.

EXAMPLE 5

Magnetic tape was prepared by the same method as in Example 1 except that the pH of the adsorption bath used for the surface treatment of the magnetic powder was adjusted to 9.

Comparative example 1

Magnetic tape was prepared by the same method as in Example 1 except that the copolymer used carried carboxyl groups in the free form instead of the form of ammonium salt had a solubility to water below 10 weight percent.

Comparative example 2

Magnetic tape was prepared by the same method as in Example 4 except that a copolymer as disclosed in Japanese Patent Opening No. 23207/1975, which had the same molecular structure as the copolymer of Example 1 differing in that the ammonium salt of maleic acid comprising the latter was replaced by the half amide of this acid with one carboxyl group left free and the other converted to acid amide, was dissolved in methanol.

Tapes thus made were tested for the coercive force (Hc), residual magnetic flux density (Br), squareness ratio (Sq), gloss, and video characteristics as measured by the following methods:

Gloss: The gloss was measured on a goniometer as manufactured by Murakami Research Laboratory Co., Ltd. with both the angles of incidence and reflection set to 60°. The standard plate gave the control data which was 100%.

Video S/N: 50% white signal of 0.36 $V_{pp}$ was recorded and played back and the noise level was read out directly from a noisemeter Shibasoku 725D/1.

Chroma: 100% choma signal superposed on white S/N signal of 0.36 $V_{pp}$ was recorded and played back and the noise level was read out directly from noisemeter Shibasoku 925D/1.

The results of measurements were summarized in the following table:

| | Mother liq. pH | Hc (oe) | Br (gauss) | Sq | Gloss (%) | Video S/N (%) | Chroma S/N (%) |
|---|---|---|---|---|---|---|---|
| Ex. 1 | 7 | 648 | 1303 | 0.78 | 130 | 46.0 | 40.6 |
| Ex. 2 | 6 | 660 | 1381 | 0.80 | 135 | 46.3 | 41.5 |
| Ex. 3 | 6 | 701 | 1400 | 0.81 | 140 | 47.0 | 40.5 |
| Ex. 4 | 6 | 640 | 1300 | 0.76 | 120 | 45.5 | 39.5 |
| Ex. 5 | 9 | 645 | 1350 | 0.75 | 110 | 44.8 | 38.5 |
| Comp. 1 | 6 | 620 | 1250 | 0.68 | 80 | 40.1 | 36.0 |
| Comp. 2 | — | 640 | 1300 | 0.74 | 100 | 43.0 | 38.0 |

These results proved that the magnetic powder that was surface treated with the copolymer of the invention directly after cobalt deposition without drying dispersed well resulting in favorable performances in the magnetic and electric characteristics.

Another finding was that the adsorption of the copolymer depended on the pH level of the adsorption bath with satisfactory adsorption achieved at pH=6 but not at pH=9. It was also found that when the cobalt-deposited magnetic powder was filtered and dried before surface treatment, the treated powder was less dispersible probably because the copolymer might be adsorbed on powder at the coagulated state.

EXAMPLE 6

First, the cobalt-deposited Γ-Fe2O3 was surface treated with a copolymer comprising ammonium acrylate and butyl acrylate. Namely, to 100 parts of iron oxide whose specific surface area (BET value) was 35 m$^2$/g, an aqueous solution of the copolymer was added in a volume that contained 25 parts of solids, and the mixture was kneaded 2 hours on a kneader (manufacturer: Inoue Manufacturing Co., Ltd.). The surface treated magnetic powder was transferred to a rotary vibration type drier to evaporate its water content. Further, the powder was pulverized on a colloid mill and passed through a meshed sieve for classification. A treated magnetic powder whose specific surface area was equivalent to that of the original magnetic powder (35 m²/g) was thus prepared.

This treated magnetic powder was used in the following formulation:

| | |
|---|---|
| Treated Co—deposited γ-Fe₂O₃ as mentioned above (BET value: 35 m²/g) | 100 parts |
| Polyurethane "Eston 5701" from Goodrich | 14 parts |
| Nitrocellulose "Celnova BTH ½" from Asahi Chemical Industry | 5 parts |
| Vinyl chloride-vinyl acetate copolymer "VAGH" from Union Carbide | 1 part |
| Carbon black "Conductex 975" (BET value: 270 m²/g, grain size: 46 mμ) | 2.5 parts |
| Carbon black "Raven 2000" (BET value: 180 m²/g, grain size: 19 mμ) | 2.5 parts |
| Lecithin | 5 parts |
| Myristic acid | 2 parts |
| Butyl palmitate | 1 part |
| Alumina | 4 parts |
| Methyl ethyl ketone | 50 parts |
| Cyclohexane | 100 parts |

The above composition was fully agitated and mixed on a ball mill. During agitation, a sample was taken at fixed intervals of time to smear a glass plate and the degree of dispersion was checked in comparison to the standard plate by a microscope of 100 magnifications to determine the timing when the agitation was stopped. 5 parts of a hardener (polyfunctional isocyanate) was added to this composition and the mixture was passed through a filter of mean pore size of 1 μm. The magnetic paint thus prepared was coated on 15 μm thick polyester film by a reverse roll coater under application of a magnetic field. It was then dried, resulting in a 5 μm thick dry coating. Next, the surface of the magnetic layer was calendered by a super calender roll, which gave a wide magnetic film web having a magnetic layer of a given thickness. This film was slit at intervals of 12.7 mm to prepare video magnetic tape.

EXAMPLE 7

Magnetic tape was prepared by the same method as in Example 6 except that for the magnetic powder in the formulation of the magnetic paint used in the same Example magnetic powder surface treated with a copolymer composed of sodium acrylate and butyl acrylate was used.

EXAMPLE 8

Magnetic tape was prepared by the same method as in Example 6 except that for the magnetic powder in the formulation of the magnetic paint used in the same Example ferromagnetic iron powder having a specific surface area (BET value) of 35 m²/g and surface treated with a copolymer composed of ammonium acrylate and butyl acrylate was used.

EXAMPLE 9

Magnetic tape was prepared by the same method as in Example 8 except that for the magnetic powder in the formulation of the magnetic paint used in the same Example magnetic powder that was treated with a copolymer composed of sodium acrylate and butyl acrylate was used.

Comparative example 3

Magnetic tape was prepared by the same method as in Example 6 except that for the magnetic powder in the formulation of the magnetic paint of the same Example magnetic powder that was treated with a copolymer composed of acrylic acid and butyl acrylate was used.

Comparative example 4

Magnetic tape was prepared by the same method as in Example 6 except that for the magnetic powder used in the formulation of the magnetic paint of the same Example magnetic powder that was not surface treated at all was used.

Comparative example 5

Magnetic tapes were prepared by the same method as in Example 8 except that the ferromagnetic iron powder used was surface treated with a copolymer composed of acrylic acid and butyl acrylate.

Comparative example 6

Magnetic tape was prepared by the same method as in Example 8 except that the ferromagnetic iron powder used was not surface treated at all.

Comparative example 7

Magnetic tape was prepared by the same method as in Example 6 except that for the magnetic powder in the formulation of the paint of the same Example cobalt deposited γ-Fe₂O₃ powder having a specific surface area (BET value) of 25 m²/g and surface treated with a copolymer composed of ammonium acrylate and butyl acrylate was used.

Comparative example 8

Magnetic tape was prepared by the same method as in Comparative example 7 except that for the magnetic powder in the formulation of the paint of the same Comparative example magnetic powder that was surface treated with a copolymer composed of sodium acrylate and butyl acrylate was used.

Comparative example 9

Magnetic tape was prepared by the same method as in Comparative example 7 except that for the magnetic powder in the formulation of the paint of the same Comparative example magnetic powder that was surface treated with a copolymer composed of acrylic acid and butyl acrylate was used.

Comparative example 10

Magnetic tape was prepared by the same method as in Comparative example 5 except that for the magnetic powder in the formulation of paint of the same Comparative example magnetic powder that was not surface treated at all was used.

Tapes thus prepared were tested for the squareness ratio (Sq), gloss, oozing to surface (blooming) under thermal treatment, dispersion time, and video characteristics by the following methods:

Gloss: The gloss was measured on a goniometer at an angle of 60° and the results were given in comparison to the estimate from Comparative example 2 which was 100%. It is noted that a larger value means a smoother surface.

Dispersion: Necessary time to achieve a certain time degree of dispersion was determined under microscopic observation.

Video: The playback output at 4 MHz was characteristics measured for the RF output by a video deck HR-3300 (manufacturer: Victor Co. of Japan, ltd. The results are shown in relative values as compared to Comparative example 2 that is zero. The video S/N ratio was similarly measured and indicated.

The results of measurements were summarized in the following table:

|  | Magnetic powder | Spec. surf. area (m²/g) | Unit A* | Sq | Gloss (%) | Dispersion time (hr) | RF output (dB) | Video S/N ratio (dB) | blooming |
| --- | --- | --- | --- | --- | --- | --- | --- | --- | --- |
| Ex. 6 | Co—γ-Fe₂O₃ | 35 | Ammonium acrylate | 0.82 | 130 | 24 | +2.0 | +2.0 | None |
| Ex. 7 | " | " | Sodium acrylate | 0.80 | 110 | 36 | +1.0 | +1.5 | None |
| Comp. 3 | " | " | Acrylic acid | 0.78 | 108 | 48 | +1.0 | +1.0 | Slightly detected |
| Comp. 4 | " | " | — | 0.75 | 100 | 72 | 0 | −1.0 | None |
| Ex. 8 | Fe | " | Ammonium acrylate | 0.85 | 140 | 36 | +5.0 | +6.0 | None |
| Ex. 9 | " | " | Sodium acrylate | 0.84 | 135 | 48 | +5.0 | +5.5 | None |
| Comp. 5 | " | " | Acrylic acid | 0.80 | 128 | 48 | +4.0 | +3.0 | None |
| Comp. 6 | " | " | — | 0.75 | 120 | 72 | +1.0 | +1.0 | None |
| Comp. 7 | Co—γ-Fe₂O₃ | 25 | Ammonium acrylate | 0.83 | 130 | 48 | +1.0 | −1.0 | None |
| Comp. 8 | " | " | Sodium acrylate | 0.81 | 128 | 60 | 0 | −1.5 | None |
| Comp. 9 | " | " | Acrylic acid | 0.79 | 125 | 60 | 0 | −1.5 | Detected |
| Comp. 10 | " | " | — | 0.76 | 120 | 60 | −1.0 | −2.5 | None |

*A monomer component of the copolymer used in the surface treatment of magnetic powder.

These results proved clearly that by contrast to magnetic powder that was surface treated with a copolymer that comprised merely a free organic acid as a monomer component and to one that was not surface treated at all, magnetic powder that was surface treated with the copolymer as mentioned above and particularly one provided in the form of ammonium salt, when used, gave higher dispersibility and prevented oozing in the surface, resulting in an improved squareness ratio and higher gloss, and avoidance of oozing in tape surface. Moreover, the time of dispersion is substantially shortened, which improves the productivity substantially, compensating for the cost-up due to the surface treatment of magnetic powder quite fully and even allowing a cost-down. It is noted from Comparative examples 7 to 10 that the surface treatment with the ammonium salt of copolymer gave the best characteristics but in these cases the grain size of the magnetic powder used was larger with the BET value of 25 m²/g so there were no substantial differences in characteristics between these examples. By contrast, in case magnetic powder with the BET value of 35 m²/g was used according to the invention, it will be understood that the surface treatment with the aforementioned salt of copolymer gave results that were remarkably different from those given in other cases.

EXAMPLES 10 to 18

Cobalt deposited γ-Fe₂O₃ or Co-γ-Fe₂O₃ was surface treated with copolymers as mentioned below in (a) to (i) to give corresponding treated magnetic powders. Namely, to 100 parts of iron oxide powder aqueous solution of each copolymer was added in an amount that contained 2.5 parts of solids. The mixture was kneaded 2 hr on a kneader (manufacturer: Inoue Manufacturing Co., Ltd.). The treated magnetic powder was then transferred to a rotary vibration type drier to evaporate its moisture content. The powder was further pulverized on a colloid mill and passed through a meshed sieve for classification. Treated powders of desirable grain size were thus obtained.

(a) Ammonium salt of a copolymer as composed of acrylic acid and butyl acrylate;
(b) Ammonium salt of a copolymer as composed of acrylic acid and N-octylacrylamide
(c) Sodium salt of a copolymer as composed of acrylic acid and butyl acrylate;
(d) Ammonium salt of a copolymer as composed of maleic anhydride and styrene;
(e) Octylamine salt (ammonium salt) of a copolymer as composed of methacrylic acid and methyl methacrylate;
(f) Ammonium salt of a copolymer as composed of 2-hydroxyethylacryloyl phosphate and lauryl acrylate;
(g) Ammonium salt of a copolymer as composed of acrylic acid and propylene;
(h) Butyl amine salt (ammonium salt) of a copolymer as composed of methacrylic acid and butylene; and
(i) Ammonium salt of a copolymer as composed of acrylic acid and ethylene.

These treated magnetic powders were used in the following formulation:

| | |
| --- | --- |
| Treated cobalt deposited γ-Fe₂O₃ as mentioned above (BET value: 40 m²/g) | 100 parts |
| Soft polyurethane "Pandex T-5610" from Dainippon Ink & Chemicals (tensile strength: 120 Kg/cm², breaking elongation: 1050%) | 7 parts |
| Hard polyurethane "Nipolan N-2304" from Dainippon Polyurethane Co., Ltd. (tensile strength: 400 Kg/cm², breaking elongation: 700%) | 7 parts |
| Nitrocellulose "Celnova BTH ½" from Asahi Chemical Industry Co., Ltd. | 5 parts |
| Vinyl chloride-vinyl acetate copolymer "VAGH" from Union Carbide Corp. | 1 part |
| Carbon black "Conductex 975" (BET value: 270 m²/g, grain size: 46 mμ) | 2.5 parts |
| Carbon black "Raven 2000" (BET value: 180 m²/g, grain size: 19 mμ) | 2.5 parts |
| Lecithin | 5 parts |
| Myristic acid | 2 parts |
| Butyl palmitate | 1 part |
| Alumina | 4 parts |
| Methyl ethyl ketone | 50 parts |
| Cyclohexane | 100 parts |

The above composition was fully agitated and mixed on a ball mill. During agitation, a sample was taken at fixed intervals of time to smear a glass plate and the degree of dispersion was checked in comparison to the standard plate by a microscope of 100 magnifications to determine the timing when the agitation was stopped. 5 parts of a hardener polyfunctional isocyanate was added to this composition and the mixture was passed through a filter of mean pore size of 1 μm. The magnetic paint thus prepared was coated on 14 μm thick polyester film by a reverse roll coater under application of a magnetic field. It was then dried, resulting in a 6 μm thick dry coating. Next, the surface of the magnetic layer was calendered by a super calender roll, which gave a wide magnetic film web having a magnetic layer of a given thickness. This film was slit at intervals of 12.7 mm to prepare video magnetic tapes.

Comparative example 11

Magnetic tape was prepared by the same method as in Examples 10 to 18 except that for the magnetic powder in the formulation of the paint of these Examples magnetic powder surface treated with a copolymer as composed of acrylic acid butyl acrylate was used.

Comparative example 12

Magnetic tape was prepared by the same method as in Examples 10 to 18 except that for the magnetic powder in the formulation of the paint of these Examples magnetic powder that was not surface treated at all was used.

The above tapes were tested in the squareness ratio, gloss, viscosity, time of dispersion, and video characteristics. The results were summarized in the following table:

|  | Copolymer for treatment | Sq | Gloss (%) | Viscosity at 25° (poise) | Dispersion time (hr) | RF output (dB) | Video S/N (dB) | Chroma S/N (dB) | blooming |
| --- | --- | --- | --- | --- | --- | --- | --- | --- | --- |
| Ex. 10 | a | 0.83 | 123 | 24 | 24 | +1.5 | +1.0 | +1.2 | None |
| Ex. 11 | b | 0.84 | 135 | 26 | 24 | +2.0 | +1.2 | +1.5 | None |
| Ex. 12 | c | 0.80 | 110 | 30 | 36 | +0.3 | +1.0 | +0.5 | None |
| Ex. 13 | d | 0.82 | 115 | 22 | 24 | +0.8 | +1.0 | +0.8 | None |
| Ex. 14 | e | 0.83 | 118 | 18 | 24 | +1.0 | +1.0 | +0.9 | None |
| Ex. 15 | f | 0.80 | 120 | 28 | 24 | +1.0 | +1.0 | +0.5 | None |
| Ex. 16 | g | 0.83 | 135 | 16 | 24 | +1.5 | +1.5 | +1.0 | None |
| Ex. 17 | h | 0.81 | 115 | 30 | 24 | +0.7 | +2.0 | +0.8 | None |
| Ex. 18 | i | 0.82 | 130 | 26 | 24 | +1.5 | +1.7 | +0.8 | None |
| Comp. 11 | Copolymer in free acid form | 0.78 | 100 | 40 | 36 | 0 | 0 | 0 | Slightly detected |
| Comp. 12 | No surface treatment | 0.75 | 85 | 50 | 72 | −1.0 | −1.0 | −0.5 | None |

These results prove that by contrast to magnetic powder that was surface treated with a copolymer that comprised a merely free organic acid as a monomer component (Comparative example 11) and to one that was not surface treated at all (Comparative example 12), magnetic powders that were surface treated with individual copolymers of (a) to (i) and particularly ones treated with copolymers provided in the form of ammonium salt, when used, gave higher squareness ratios and improved gloss, and yet were capable of giving magnetic paint of low viscosity. Moreover, the time of dispersion was substantially shortened, which allows a substantial improvement in the productivity to compensate for the cost-up due to the surface treatment of magnetic powder quite fully and even achieve a cost-down. It is noted that the low viscosity of magnetic paint allows reduction in the amount of solvent to increase the solids concentration, which means a less load on the production facilities on drying.

It will be evident that various modifications can be made to the described embodiments without departing from the scope of the present invention.

What is claimed is:

1. A magnetic recording medium comprising a support and a magnetic layer thereon, said magnetic layer being formed by coating said support with a magnetic paint comprising
   (a) an organic solvent,
   (b) an organic binder, and
   (c) a magnetic powder,
   said magnetic powder being pre-treated with a copolymer containing at least one monomer component having an anionoid organic group in the form of a salt and a second monomer component, said copolymer being capable of being dissolved in water in an amount of at least 10 parts by weight of said copolymer per 100 parts by weight of water.

2. The medium of claim 1, wherein the polymerization degree of said copolymer, expressed as the total number of monomer units contained within said copolymer, is up to 100.

3. A magnetic recording medium as claimed in claim 1 wherein said anionoid organic group or groups are carboxyl groups.

4. A magnetic recording medium as claimed in claim 4 wherein said monomer component is an alkylene with a plurality of carboxyl groups attached to carbon atoms comprising the main molecular chain of said alkylene.

5. A magnetic recording medium as claimed in claim 1 wherein the other monomer component or components are alkylenes of branched chain having 4 or more carbon atoms.

6. A magnetic recording medium as claimed in claim 1 wherein said magnetic powder has a specific surface area (BET value) of 30 m$^2$/g or over.

7. A magnetic recording medium as claimed in claim 1 wherein said magnetic layer contains a soft polyurethane having a tensile strength less than 200 kg/cm$^2$ and breaking elongation of 900% or over, hard polyurethane having a tensile strength of 200 kg/cm$^2$ or over and breaking elongation below 900%, and magnetic powder pretreated with a copolymer that comprises one or more monomer component having an anionoid organic group or groups in the form of salt.

8. The process of claim 7 wherein the degree of polymerization of said copolymer, as expressed by the total number of monomer units contained within said copolymer, is up to 100.

9. A process of preparing a magnetic recording medium comprising
   (i) treating a magnetic powder in an aqueous or hydrophilic medium with a copolymer which contains at least 1 monomer component having an anionoid organic group in the form of a salt and a second monomer component, said copolymer capable of being dissolved in water in an amount of at least 10 parts by weight of said copolymer in 100 parts by weight of water, (ii) separating said treated magnetic powder from said aqueous or hydrophilic medium,
(iii) drying said treated magnetic powder,
(iv) preparing a magnetic paint comprising said treated magnetic powder, an organic binder, and an organic solvent, and
(v) coating said magnetic paint on a support to form said magnetic recording medium.

10. A process as claimed in claim 9 wherein said magnetic powder is treated with said copolymer in said aqueous medium adjusted to a pH of 7 or more.

11. A process as claimed in claim 9 wherein after said magnetic powder is treated with said copolymer the treated magnetic powder is further immersed in liquid organic substance under presence of an oxidative gas and if necessary then dried under presence of an oxidative gas.

12. A process as claimed in claim 9 wherein said anionoid groups are carboxyl groups.

13. A process as claimed in claim 12 wherein said monomer component is an alkylene having a plurality of carboxyl groups in the main chain thereof.

14. A process as claimed in claim 9 wherein the other monomer component or components of said copolymer is a branched chain alkylene having 4 or more carbon atoms.

* * * * *